US012541900B2

(12) United States Patent
Green et al.

(10) Patent No.: US 12,541,900 B2
(45) Date of Patent: Feb. 3, 2026

(54) ACCELERATED IMAGE RECONSTRUCTION SYSTEMS INCLUDING AN X-RAY TOMOGRAPHY IMAGE RECONSTRUCTION SYSTEM USING A PROJECTION OPERATOR MATRIX

(71) Applicant: nView medical Inc., Salt Lake City, UT (US)

(72) Inventors: Jared Green, Salt Lake City, UT (US); Mark Elliott, Salt Lake City, UT (US); Cristian Atria, Salt Lake City, UT (US)

(73) Assignee: nView medical Inc., Salt Lake City, UT (US)

( * ) Notice: Subject to any disclaimer, the term of this patent is extended or adjusted under 35 U.S.C. 154(b) by 573 days.

(21) Appl. No.: 17/963,927

(22) Filed: Oct. 11, 2022

(65) Prior Publication Data

US 2023/0110437 A1 Apr. 13, 2023
US 2023/0316601 A9 Oct. 5, 2023

Related U.S. Application Data

(60) Provisional application No. 63/254,278, filed on Oct. 11, 2021.

(51) Int. Cl.
*G06T 11/00* (2006.01)
(52) U.S. Cl.
CPC .......... *G06T 11/008* (2013.01); *G06T 11/006* (2013.01); *G06T 2210/41* (2013.01); *G06T 2211/412* (2013.01); *G06T 2211/424* (2013.01)
(58) Field of Classification Search
CPC ......... G06T 11/003; G06T 2207/10081; G06T 2207/10116; G06T 15/00; G06T 11/005; G06T 19/00; G06V 10/20; G06V 20/64
See application file for complete search history.

(56) References Cited

U.S. PATENT DOCUMENTS

| | | | |
|---|---|---|---|
| 2004/0120564 A1* | 6/2004 | Gines ................... | G06T 11/006 382/131 |
| 2013/0129172 A1* | 5/2013 | Boese ................... | G06T 7/0012 382/131 |

(Continued)

FOREIGN PATENT DOCUMENTS

| | | | | |
|---|---|---|---|---|
| CN | 102842141 B | * | 3/2015 | |
| CN | 111724452 A | * | 9/2020 | ........... G06T 11/003 |

OTHER PUBLICATIONS

Beister et al., Iterative reconstruction methods in X-ray CT, Physica Medica, vol. 28, Issue 2, 2012, pp. 94-108, do: 10.1016/j.ejmp.2012.01.003.*

(Continued)

*Primary Examiner* — Guillermo M Rivera-Martinez
(74) *Attorney, Agent, or Firm* — Thorpe North & Western, LLP

(57) ABSTRACT

The present technology relates to an imaging system. The imaging system can comprise at least one processor configured to apply a projection precomputation algorithm and an x-ray tomography image reconstruction system. The projection precomputation algorithm can be configured to: generate a projection operator matrix that can be used to calculate a plurality of voxels from a plurality of projection measurements before the plurality of projection measurements is acquired and store the projection operator matrix in memory. The projection operator matrix can be at least one of: a compressed matrix, a multi-iteration projection operator matrix, and a combination thereof. The x-ray tomography image reconstruction system can be configured to apply the projection operator matrix to generate a reconstructed three-dimensional image of at least an internal portion of a selected object under a surface of the selected object when the plurality of projection measurements is acquired.

20 Claims, 18 Drawing Sheets

(56) References Cited

U.S. PATENT DOCUMENTS

| | | | | |
|---|---|---|---|---|
| 2014/0029819 | A1* | 1/2014 | Zeng | G06T 11/006 |
| | | | | 382/131 |
| 2014/0247264 | A1* | 9/2014 | Sundberg | G06T 11/006 |
| | | | | 345/424 |
| 2017/0161923 | A1* | 6/2017 | Nakano | G06T 3/4007 |
| 2017/0345190 | A1* | 11/2017 | Shi | G06T 5/70 |
| 2018/0182128 | A1* | 6/2018 | Champley | G06T 11/006 |
| 2019/0333254 | A1* | 10/2019 | Lyu | G06T 7/50 |
| 2024/0185485 | A1* | 6/2024 | Salomon | G06T 11/006 |

OTHER PUBLICATIONS

Guo et al., Memory-efficient algorithm for stored projection and backprojection matrix in helical CT, Med Phys. Apr. 2017, 44(4), pp. 1287-1300, doi: 10.1002/mp.12118. PMID: 28120362.*

* cited by examiner

ACCELERATED IMAGE RECONSTRUCTION SYSTEMS INCLUDING AN X-RAY TOMOGRAPHY IMAGE RECONSTRUCTION SYSTEM USING A PROJECTION OPERATOR MATRIX

RELATED APPLICATION

This application claims the benefit of U.S. Provisional Application Ser. No. 63/254,278, filed on Oct. 11, 2021, the entire contents of which are incorporated herein by reference.

GOVERNMENT INTEREST

This invention was made with government support under Award No. 2036690 awarded by the National Science Foundation. The government has certain rights in the invention.

BACKGROUND

Tomography is imaging by sections or sectioning, through the use of any kind of penetrating wave. Tomographic reconstruction may be a mathematical procedure used to reconstruct an image of an object. For example, x-ray computed tomography may produce an image from multiple projectional radiographs. Tomographic reconstruction is a type of multidimensional inverse project involving the challenge of yielding an estimate of a specific object from a finite number of projections.

SUMMARY

In one embodiment, an imaging system can comprise at least one processor configured to apply a projection precomputation algorithm to generate a projection operator matrix (e.g., a back projection operator matrix) before subsequent projection measurements are acquired, and an x-ray tomography image reconstruction system configured to apply the projection operator matrix to generate a reconstructed three-dimensional image of at least an internal portion of a selected object under a surface of the selected object.

In one aspect, the projection precomputation algorithm can be configured to: generate a projection operator matrix (e.g., a back projection operator matrix) that can be used to calculate a plurality of voxels from a plurality of projection measurements before the plurality of projection measurements are acquired. In another aspect, the projection precomputation algorithm can be at least one of: a compressed matrix, a multi-iteration projection operator matrix, and a combination thereof. In yet another aspect, the projection precomputation algorithm can be configured to store the projection operator matrix in memory.

In another embodiment, a method for x-ray tomography image reconstruction can comprise generating a projection operator matrix that can be used to calculate a plurality of voxels from a plurality of projection measurements before the plurality of projection measurements are acquired. The projection operator matrix can be at least one of: a compressed matrix, a multi-iteration projection operator matrix, and a combination thereof. The method can further comprise storing the projection operator matrix in memory. The method can further comprise applying the projection operator matrix to generate a reconstructed three-dimensional image of at least an internal portion of a selected object under a surface of the selected object when the plurality of projection measurements is acquired.

In yet another embodiment, a non-transitory machine-readable storage medium can include instructions embodied thereon. In one aspect, the instructions, when executed by at least one processor, can implement the method as disclosed herein.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure.

Figure 1:
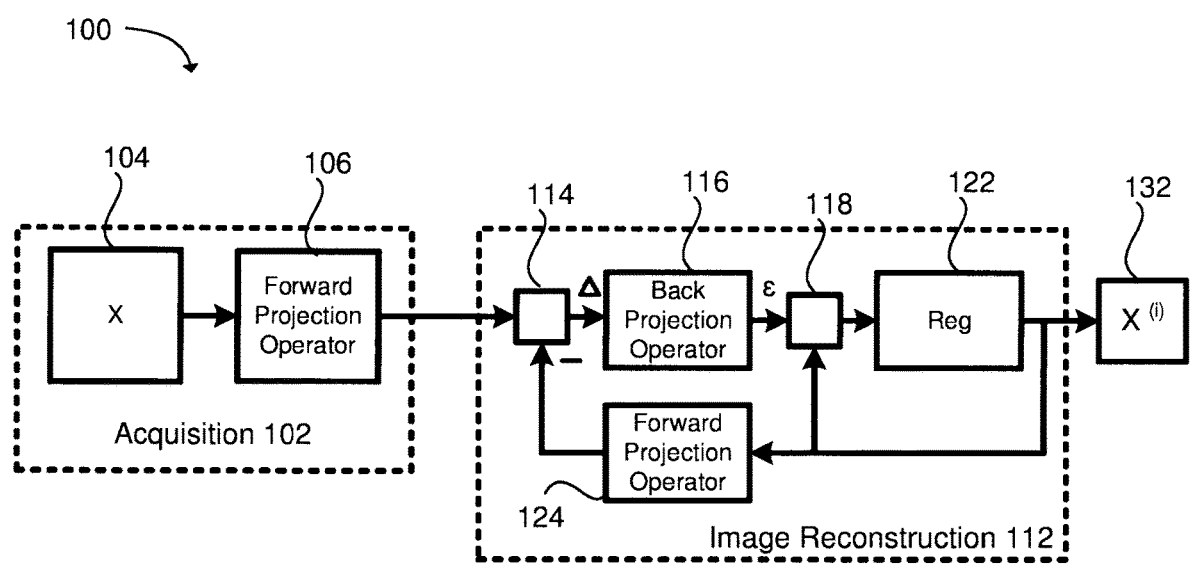
FIG. 1 is a flow diagram that illustrates an example method for image reconstruction via an iterative reconstruction scheme utilizing forward and back-projection operators.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

The singular forms "a," "an," and "the" include plural referents unless the context clearly dictates otherwise. Thus, for example, reference to "a constraint" includes reference to one or more of such values, and reference to "binning" refers to one or more such steps.

As used herein with respect to an identified property or circumstance, "substantially" refers to a degree of deviation that is sufficiently small so as to not measurably detract from the identified property or circumstance. The exact degree of deviation allowable may in some cases depend on the specific context. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, the term "about" is used to provide flexibility and imprecision associated with a given term, metric or value. The degree of flexibility for a particular variable can be readily determined by one skilled in the art. However, unless otherwise enunciated, the term "about" generally connotes flexibility of less than 2%, and most often less than 1%, and in some cases less than 0.01%.

As used herein, "memory footprint" refers to the amount of memory for one or more memory devices (e.g., GPU, RAM, a hard disk drive, a cloud computing environment, or the like). As used herein, a recitation of a memory device can comprise one or more memory devices (e.g., a plurality of memory devices) and the memory footprint can include the total memory associated with the plurality of memory devices. In one example, the memory device can be a graphics processor unit (GPU) memory. For example, the memory footprint can include the size of the on-board GPU memory. In one example, for a GPU having 6 GB of graphics memory, the memory footprint can include at least the 6 GB of memory. In another example, the memory device can include RAM. For RAM having a size of 16 GB, the memory footprint can include at least the 16 GB of memory. In another example, the memory device can include a hard disk drive. For a hard disk drive having a size of 128 GB, the memory footprint can include at least the 128 GB of memory. In another example, the memory device can include a cloud computing environment. For a cloud computing environment having a size of 256 GB, the memory footprint can include at least the 256 GB of memory. From these examples, by illustration, the memory footprint associated with the GPU, RAM, hard disk drive, and cloud computing environment can be the sum of the individual memories, which is 406 GB.

As used herein, a "projection operator" refers to an operator used to project from a 3-dimensional object to a 2-dimensional projection or from a 2-dimensional projection to a 3-dimensional object. When the projection operator is used to project from a 3-dimensional object to a 2-dimensional projection, the projection operator is a forward projection operator. When the projection operator is used to project from a 2-dimensional projection to a 3-dimensional object, the projection operator is a back projection operator matrix. The "projection operator" can be modeled using a matrix.

As used herein, a "multi-iteration projection operator" refers to a projection operator that is used to project from a 3-dimensional object to a 2-dimensional projection or from a 2-dimensional projection to a 3-dimensional object that is computed from a back or forward projection operator computed in multiple iterations (e.g., a plurality of back or forward projections). The multi-iteration projection operator facilitates multiple back or multiple forward projections using a single projection operator which can be represented as a single matrix.

As used herein, "thresholding" refers to computations used to approximate a result by using values above a selected threshold and "binning" values below a selected threshold. As used herein, "binning" refers to storing the values below the selected threshold. The values stored by binning can be used to converge the approximated result obtained from thresholding within a selected margin of error.

As used herein, an "nView system" refers to a tomographic system as described in U.S. Pat. No. 10,070,828, U.S. Application Publication No. US-2017-0200271-A1, and International Application Publication No. WO 2019/060843, which are incorporated by reference.

As used herein, comparative terms such as "increased," "decreased," "better," "worse," "higher," "lower," "enhanced," "improved," "maximized," "minimized," and the like refer to a property of a device, component, composition, or activity that is measurably different from other devices, components, compositions, or activities that are in a surrounding or adjacent area, that are similarly situated, that are in a single device or composition or in multiple comparable devices or compositions, that are in a group or class, that are in multiple groups or classes, or as compared to an original or baseline state, or the known state of the art. For example, an image reconstruction algorithm with "reduced" runtime can refer to an image reconstruction algorithm which has a lower runtime duration than one or more other image reconstruction algorithms. A number of factors can cause such reduced runtime, including materials, configurations, architecture, connections, etc.

Reference in this specification may be made to devices, structures, systems, or methods that provide "improved"

performance. It is to be understood that unless otherwise stated, such "improvement" is a measure of a benefit obtained based on a comparison to devices, structures, systems or methods in the prior art. Furthermore, it is to be understood that the degree of improved performance may vary between disclosed embodiments and that no equality or consistency in the amount, degree, or realization of improved performance is to be assumed as universally applicable.

In this disclosure, "comprises," "comprising," "containing" and "having" and the like can have the meaning ascribed to them in U.S. patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. patent law. "Consisting essentially of" or "consists essentially of" have the meaning generally ascribed to them by U.S. patent law. In particular, such terms are generally closed terms, with the exception of allowing inclusion of additional items, materials, components, steps, or elements that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open-ended term, like "comprising" or "including," in the written description it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein.

The term "coupled," as used herein, is defined as directly or indirectly connected in a biological, chemical, mechanical, electrical, or nonelectrical manner. "Directly coupled" structures or elements are in contact with one another. In this written description, recitation of "coupled" or "connected" provides express support for "directly coupled" or "directly connected" and vice versa.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "at least one of" is intended to be synonymous with "one or more of." For example, "at least one of A, B, and C" explicitly includes only A, only B, only C, and combinations of each.

Numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Occurrences of the phrase "in one embodiment," or "in one aspect," herein do not necessarily all refer to the same embodiment or aspect. Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

Example Embodiments

An initial overview of invention embodiments is provided below, and specific embodiments are then described in further detail. This initial summary is intended to aid readers in understanding the technological concepts more quickly but is not intended to identify key or essential features thereof, nor is it intended to limit the scope of the claimed subject matter.

In real-time applications, the computation time is the time to: (i) generate an initial output and (ii) complete a process. The ray-driven projector is currently used in medical image reconstruction because it uses localized memory access and a parallel structure, both of which enhance the time efficiency of the resulting reconstruction. Applying the process to an iterative algorithm to generate a volume over sequential forward and back projections carries strict time restraints for use in operating procedures. The minimization of delays in the operating room can inform the surgeon of complications as soon as possible and maximize surgical success rate. Thus, iterative reconstruction in a medical setting should be developed based on time constraints involving processing, memory storage, and memory access.

There are several methods for volumetric scene analysis. One such method includes ray-driven projector for forward and back projections in the application of medical x-ray imaging. One of the current methods used by Computed Tomography systems to produce 3D medical images is the calculation of the line integral to simulate X-ray physics combined with Jacobi iterations, which has been termed the Joseph method of discrete projection. The distance projector is another rendition of the ray-driven projector. The ray-driven projector initializes rays starting at the source position and projects through the volume using the projection matrix at that angle. For the forward projection this ray accumulates the voxel values to the projection plane and for the back projection retraces the projection path to place voxel densities into the volume. This iterative process of forward and back projection results in approximate density placement based on the intensity of x-rays in the initial projections.

The ray-driven method can suffer from poor image quality. Namely, the number of rays can be directly correlated to the precision of density placement and inversely correlated to the generation time. That is, a correct scene reconstruction uses extensive computation and may not be ideal for time limited operations. Secondly, the ray-driven method can lose information from angled rays because of the reduction of rays for a time-intensive process. As the rays originate from a source, the ray density decreases the closer to the projection plane, and relative to the distance of the source to the projection plane. To reduce this impact, the operation of splatting was introduced. Splatting interpolates voxel values in an area of diminishing contribution around the projected ray. Another ray-driven method involves projecting from the plane back to the source and thus concentrate rays in local areas. This method provides visibility to regional effects on the projection plane but can face similar complications.

Thus, in 2002 Bruno De Man and Samit Basu introduced distance driven projections. Distance driven projectors can use area calculations without adding to the algorithmic complexity. The splat for the distance driven projection occurs with the projection of the points to the projection plane thus expanding the influence of a single voxel across a region of the detector. The distance driven projectors operate under similar conditions with the relation between volume and projection planes. Instead of tracing rays, the distance driven method operates by projecting each z layer of voxels onto the projection plane and then calculating overlap and weights accordingly. The mathematical procedure for the operation can be independent of voxel location. However, for the forward projection, the distance driven method can be computationally inefficient due to code execution branching leading to non-predictable memory access pattern.

Code execution branching can be resolved by using a branchless method such as the Summed Area Table (SAT). This method precomputes the projections as an SAT in a cumulative summation and then uses the computation to efficiently calculate area overlap for region calculation. The distance driven projection to the plane is computed and the error result calculated from the SAT projection subtraction. The area value can then be calculated by subtraction operations. Through (bottom right)−(top left)−(the top right−top left)−(bottom left−top left) which simplifies to BR−TR−BL+TL. Thus, the area projection calculation can be done without looping over the influence region for weight calculation. However, the distance-driven SAT method still computes the SAT at every iteration operation, which can add to computational complexity.

Iterative reconstruction methods are increasingly relevant in tomography as they can bring improved image quality. In X-ray tomography (E.G., CT, Cone Beam CT, or Tomosynthesis) iterative reconstruction methods have been developed and have been shown to reduce noise or allow for sparse acquisitions that reduce time and radiation. These methods have been enabled by the increase in computational power and are often implemented in General Purpose GPU (GPGPU) computing systems. The present technology can be used to improve the performance of a tomographic systems including 2D slices and 3D object reconstruction from a Cone Beam CT, tomosynthesis or other systems such as, but not limited to, those described in U.S. Pat. No. 10,070,828, U.S. Application Publication No. US-2017-0200271-A1, and International Application Publication No. WO 2019/060843, which are incorporated by reference, by decreasing latency and enabling virtual fluoroscopy (i.e. computer generated fluoroscopic-like projections from a tomographic image).

This disclosure provides methods to perform reconstructions based on a matrix approach in which the A matrix (e.g., a forward projection operator matrix) or data derived from the A matrix is computed prior to use, and then efficiently used to compute one or more image reconstruction operations. Another aspect of the present disclosure is systems for reconstructing images using matrix optimization to process matrix A, decomposition into partial matrices, multi-iteration acceleration, grid optimization, and hyper resolution. In another aspect of the present disclosure, a multi-iteration projection operator can be computed and stored in memory for use in one or more image reconstruction algorithms.

In one embodiment, an imaging system can comprise at least one processor configured to apply a projection precomputation algorithm. The projection precomputation algorithm can be configured to generate a projection operator matrix that can be used to calculate a plurality of voxels from a plurality of projection measurements before the plurality of projection measurements are acquired. The projection operator matrix can be at least one of: a compressed matrix, a multi-iteration projection operator matrix, and a combination thereof. The projection precomputation algorithm can be configured to store the projection operator matrix in memory. The imaging system can further comprise an x-ray tomography image reconstruction system. The x-ray tomography image reconstruction system can be configured to apply the projection operator matrix to generate a reconstructed three-dimensional image of at least an internal portion of a selected object under a surface of the selected object when the plurality of projection measurements is acquired.

Regardless of the specific methodology used for producing 3D medical images (e.g., whether the ray-driven projector methodology or the distance-driven projector methodology), the purpose of the iterative process of image reconstruction is to achieve a relation between the x-ray projections and the volume over which the x-ray projections were generated. With the forming of such a relation, the x-ray projections can be iteratively compared to the relational error to converge to a solution. Thus, precomputing such a correspondence between 2-D projection data and 3-D objects can be used to generate a forward or back projection operator that can be used to accelerate the processing time, memory access time, and time for reconstructing a 3-D image.

In some examples, ray methods can be used with projections. These ray methods are known as "in-line" methods that can dynamically compute data and are therefore memory efficient. However, the number of computations used to dynamically compute data is not computationally efficient. To reduce the number of computations, a matrix can be pre-computed before image reconstruction algorithms are used. By pre-computing the matrix, redundant computations in the image reconstructions algorithm can be avoided. Compressions can be used to minimize the size of the precomputed matrix because, as a sparse matrix, various compression algorithms are available. This approach can be expanded to multiple iterations to generate a multi-iteration matrix. However, the multi-iteration matrix can become difficult to use because of the amount of memory used for storage. Thus, further compression can be used to reduce the storage size of the multi-iteration matrix.

One way to implement a method 100 for acquisition and image reconstruction is by using the forward projection operator 106 and the back projection operator 116, as shown in FIG. 1. The acquisition 102 operation implements the physical imaging process of obtaining projection data from a 3D object X 104 via a series of X-ray projections. The series of X-ray projections can be modeled as a series of forward projections using the forward projection operator 106.

The image reconstruction 112 operation implements the image processing and reconstruction method that iteratively compares the physical projections (e.g., X-ray projections) to the forward projection, calculated using the forward projection operator 124, of an assumed solution at the $(i-1)^{th}$ iteration operation (e.g., X^(i-1)) at block 114. The comparison at block 114 can be back projected using the back projection operator 116 to generate an incremental image ε at block 118. This incremental image ε at block 118 can be combined with the assumed solution at the $(i-1)^{th}$ iteration (e.g., X^(i-1). The assumed solution at the $(i-1)^{th}$ iteration (e.g., X^(i-1)) can be multiplied by a convergence coefficient λ before being combined with the incremental image ε at block 118.

In some aspects, the data generated from block 118 can be transformed or regularized using a reg operator, as shown in operation 122, to generate the solution at the $i^{th}$ iteration (i.e. X^(i)) at block 132. In some aspects, the regularizers can be time or iteration dependent, or can be applied at discrete times in the reconstruction process. In other aspects, the regularizers can be generated from a machine learning process (see e.g., US-2020-0279411-A1, which is incorporated herein by reference). In yet other aspects, image latency can be reduced using multi-scale reconstruction (see e.g., US-2020-0090384-A1, which is incorporated herein by reference).

The implementation of iterative reconstruction methods can use projector models that model the physics of a ray projection and discretize the projection model. The object can be a digital 3D object or volume, and the series of projections, indexed with their respective angles can be modeled as matrices of pixels that match the pixels of the detectors or their arrangements (for example via binning).

Figure 2:
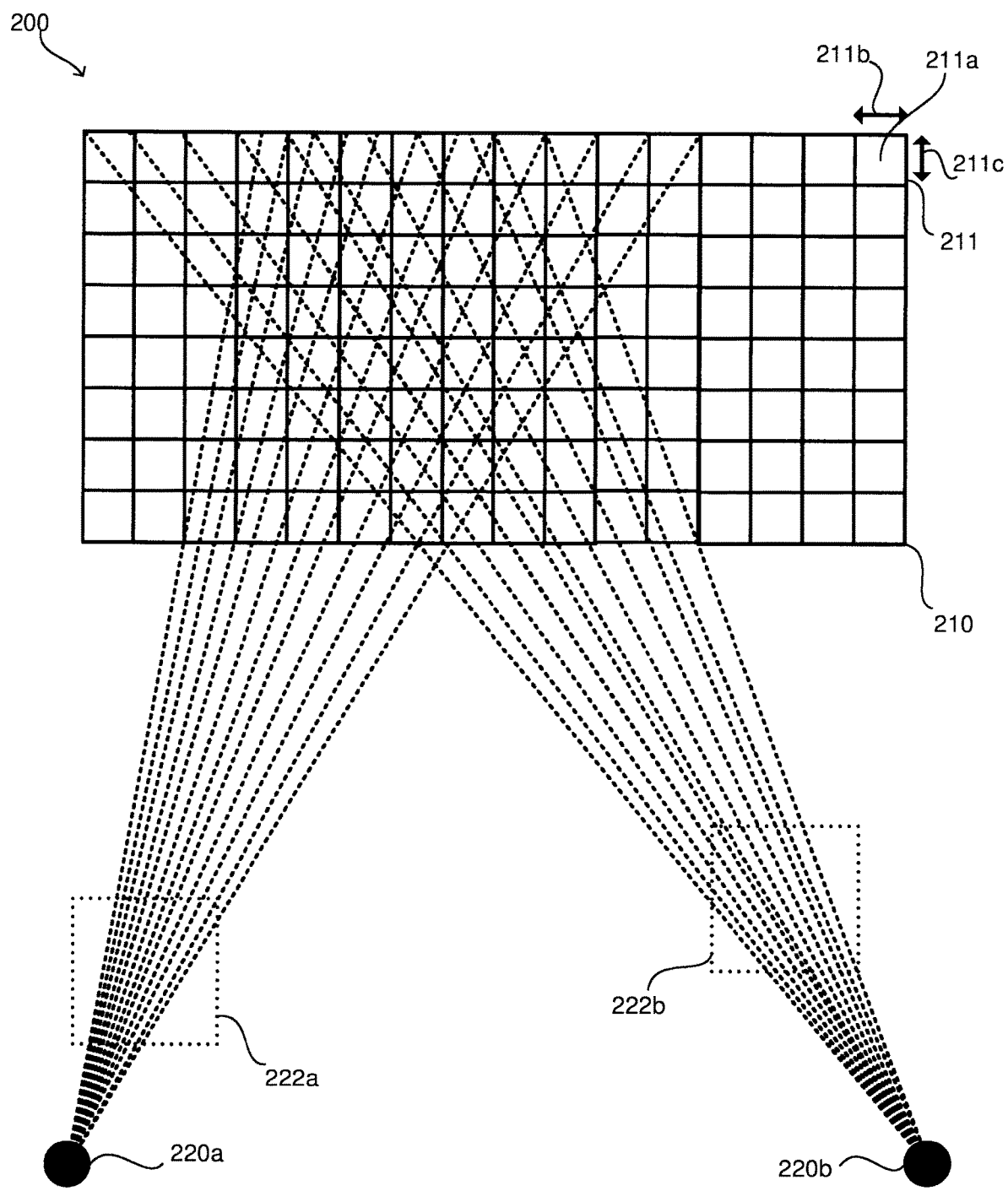
FIG. 2 is an illustration of an example discretized projection model.

The modeling of an object using matrices of pixels is illustrated as a discretized projection model 200 in FIG. 2. The discretized projection model 200 includes two X-ray sources 220a and 220b at two different positions, a collection of projection rays (e.g., 222a and 222b) emanating from the respective X-ray sources, and a grid 210 that models the object radiopacity as voxels of a 3D reconstruction. Each of the voxels (e.g., voxel 211) in the grid 210 can have a center point 211a, a width 211b, a length 211c, and a depth (not shown).

There are different projection methodologies, such as the ray driven projection methodologies (e.g., the Joseph methodology), the distance driven projection methodologies, stochastic projection methodologies, and the like. These different methodologies can provide distinct ways of modeling the projection physics. Furthermore, discretization can be modeled in different ways using these different methodologies. For example, the distance driven methodology can use weights that vary based on both the projection discretization and the object discretization.

When modeling an object as a series of projections, a forward projection operator can be used to forward project from an object to a series of projections, and a back projection operator can be used to back project from the series of projections to reconstruct the object. That is, a forward projection can be modeled as a linear operation between the object x and the projections p:

$$Ax=p$$

wherein A is the forward projection operator, and the matched back projector can be the transpose of A (i.e., $A^T$).

When calculating the forward projection operator and the back projection operator, the duration for processing and memory access can increase exponentially. In some examples, input parameters can include 360 images, which can each be about 1 megapixel in size to generate an output image having a voxel volume of about $512^3$ (i.e., 128 mega-voxels). In some examples, the forward and back projection operators can be modeled as matrices having about 45 peta-coefficients. Because of the sparsity present in the matrices, the usable size can be decreased. Nonetheless, it can be impractical to store and access the forward and back projection operators to compute a forward or back projection.

To reduce the storage and access times, the forward and back projection operators can be implemented as computer readable instructions that dynamically compute the interaction of the voxels and pixels dynamically without storing the associated matrix elements. For example, one such method can be implemented using a CPU/GPU architecture as depicted in the proceeding.

```
// Have the (i-1)^th object X in a GPU texture for fast
    access
X=texture(X)
// Parallelize the projection
Launch N threads in the GPU
// Each thread runs on a GPU core
// One ray per image pixel & angle
// N=512*512*360 rays~94 million rays
// The GPU has ~5,000 cores to run these threads
// On each thread, or ray, do the following
(u,v,phi)=f(thread_Id)
// Uniquely identify the ray (i.e. pixel u,v)
// projection (phi), based on the thread's unique id.
p_start=f(geometry, z=0)
// Start at the intersection of the ray with the edge of the
    volume (z=0 for example)
delta_p=f(geometry, delta_z)
// Compute an incremental ray operation indexed in z
proj_u_v_phi=0, p=p_start
// Initialize projection value to zero, point is p_start
For each z in the grid
// Loop over the discretization grid of the object
proj_u_v_phi+=X(p)
// Simply accumulate the radiodensity of the object as the
    ray advances.
Texture interpolates X.
p+=delta_p
P(u, v, phi)=proj_u_v_phi
// Store the projection value in memory for later use.
```

This implementation using a CPU/GPU architecture is efficient because it is highly parallel because of the use of GPUs and the independence of each ray. The GPU texture can facilitate fast and localized memory access to the object X. Furthermore, interpolation can be performed with reduced computational cost because GPUs can be configured to for these specific operations. In some examples, the forward projection operator may not be stored in memory; rather, components of the forward projection operator can be computed dynamically using interpolation and volume traversal. Even though these computations involving Ax=p can be time efficient, the computations are often re-computed for each iteration. The Joseph method of discrete projection can be used with a dynamic computation method in these cases.

To further enhance the processing time and memory access time, the ray-driven model can be expanded to include the precomputation of a sparse matrix of voxel-to-pixel relations. Recent performance enhancements in GPUs have facilitated the rapid transfers of data to and from GPU memory. The resulting parallelization capacity arising from the performance enhancements in GPUs can be used to precompute mathematical operations and, with the utilization of modern GPU memory transfer protocols, cycle through Jacobi iterations that rely on a sparse matrix for operations.

In one embodiment, as illustrated with reference to the flowchart in FIG. 3, an imaging system can comprise an x-ray tomography image reconstruction system. The imaging system can further comprise at least one processor configured to apply a projection precomputation algorithm to be used for generating the reconstructed three-dimensional image of the selected object when a plurality of projection measurements has been acquired. The x-ray tomography image reconstruction system can be configured to generate a reconstructed three-dimensional image of at least an internal portion of a selected object under a surface of the selected object after the projection precomputation algorithm has been generated and in real-time as the plurality of projection measurements are acquired.

Figure 3:
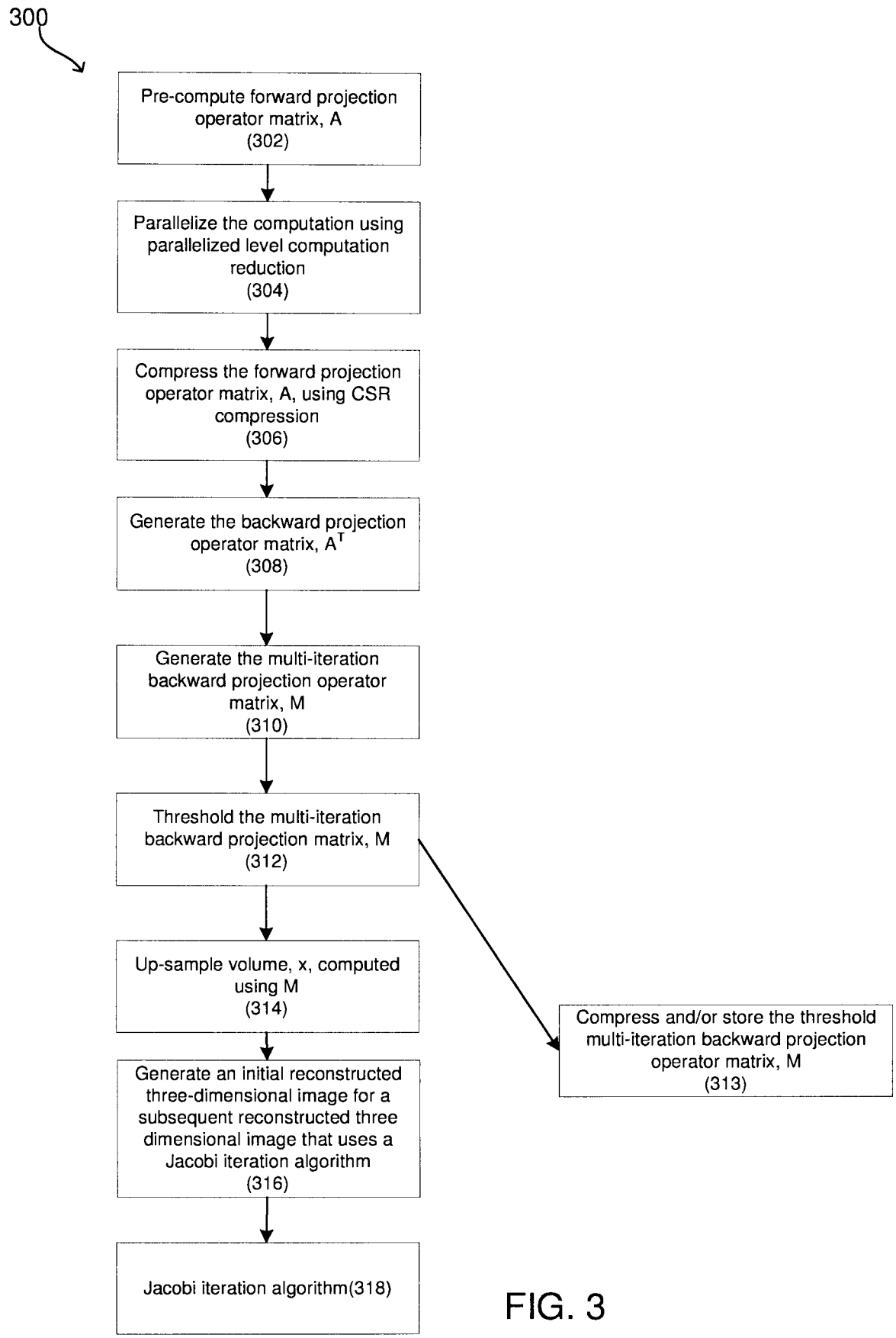
FIG. 3 is a block diagram that illustrates an example projection precomputation algorithm to generate a reconstructed three-dimensional image of an object.

The projection precomputation algorithm 300 can comprise one or more of the operations depicted in FIG. 3. In one example, the projection precomputation algorithm 300 can be configured to generate a projection operator matrix that can be used to calculate a plurality of voxels from a plurality of projection measurements. In one example, the forward projection operator matrix can be pre-computed, as depicted in operation 302. The projection operator matrix can be a forward projection operator matrix used to compute a 2-D projection (e.g., projection measurements) from a selected 3D object (e.g., a plurality of voxels), or a back projection operator matrix used to compute a selected 3D object (e.g., a plurality of voxels) from a 2-D projection (e.g., projection measurements). The forward projection operator matrix can relate the voxels to the pixels and the back projection operator can relate the pixels to the voxels. Both the forward projection operator and the back projection operator can be represented as a series of equations in a matrix.

Figure 5:
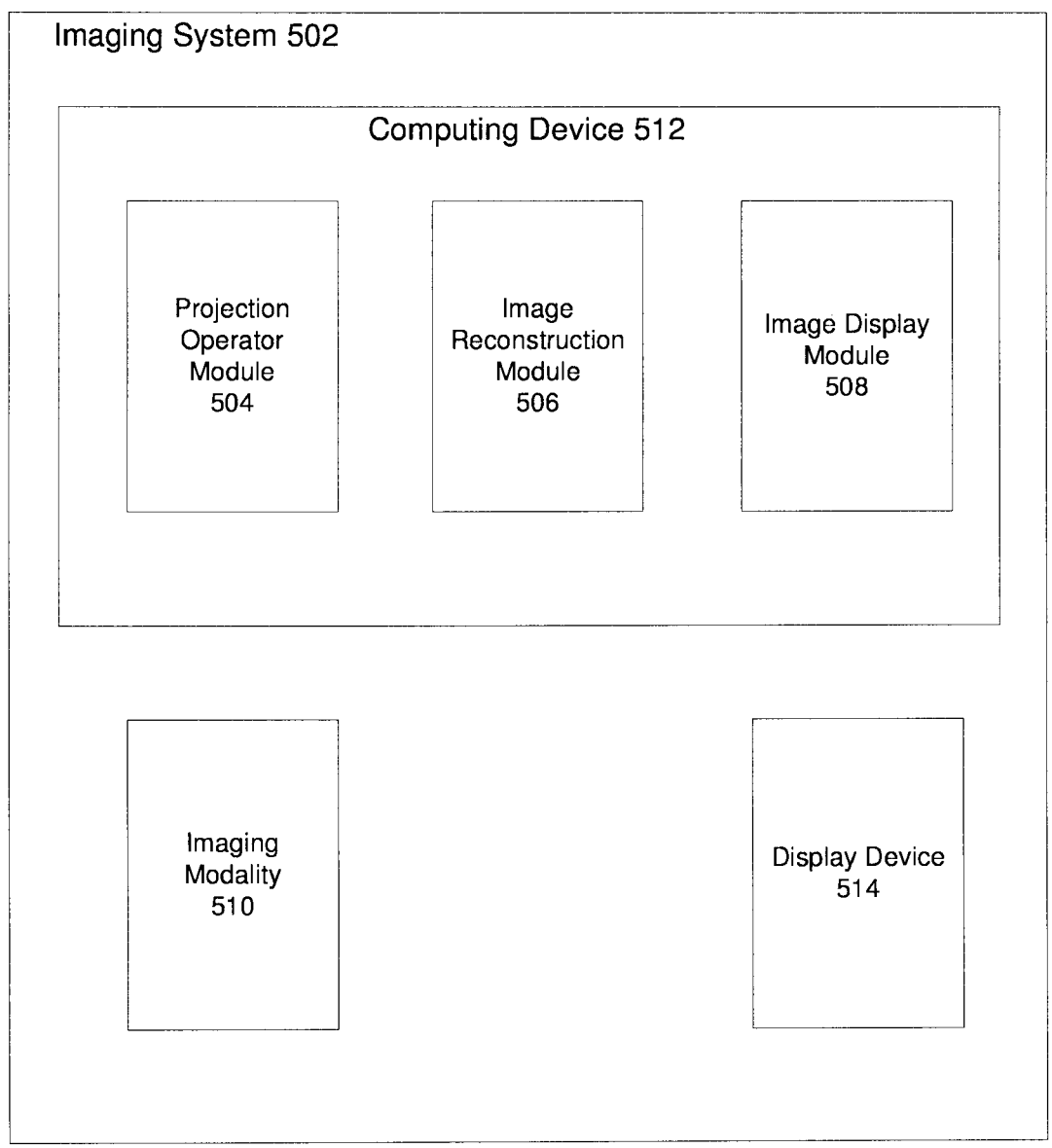
FIG. 5 is a block diagram that illustrates an example imaging system configured to reconstruct a three-dimensional object using a projection operator and a reconstruction technique.

In one example, the projection operator matrix (e.g., a forward projection operator matrix or back projection operator matrix) can be generated and stored in the memory (e.g., a graphics processor unit (GPU) memory, a RAM, a hard disk drive, a cloud computing environment) before an image reconstruction operation, as disclosed in reference to FIG. 5.

However, this direct application method in which the forward projection operator, the back projection operator, or both are precomputed and stored prior to use can be difficult to implement efficiently in different memory types. The direct application method involves the pre-calculation and storage of the forward projection operator as a system of equations, A, that relates projection measurements, p, to voxels in the reconstructed volume, x, as Ax=p. The direct pre-calculation and store can be impractical because of the size of the forward projection operator, A. In some examples, the size of A can be calculated as the number of elements in A (e.g., n_elem(A)) which can be set equal to the product of multiple variables (e.g., u*v*phi*x*y*z). Consequently, the direct application method can be used on reconstruction projects having memory sizes that would be inadequate for medical imaging. For example, the forward projection operator matrix can be in the scale of $10^{15}$ elements (e.g., peta-bytes), but a GPU memory size may be in the scale of $10^9$ elements (e.g., giga-bytes).

In many cases, the forward projection operator and back projection operator can be represented as sparse matrices because not every voxel interacts with every projection pixel. The relational distribution varies between methods. For example, the ray-driven method is substantially sparser than the distance driven method because of the locality of rays versus the z level diffusion in the distance-driven method.

The full matrix size of a projection operator matrix can have a number of rows equal to the number of voxels in the desired output volume and a number of columns equal to the input projection size. For a volume of size 384×384×384 and a projection size of 244×244, then, when using a float representation, the total size can be approximately 13 terabytes. Thus, the application of such a matrix is infeasible in terms of storage and memory transfer time. Fortuitously, many of the coefficients in the matrix will be zero values. As noted, this can be the case with the ray projection method because ray traversal through a volume renders a large portion of the volume irrelevant to the calculation of the line integral. Thus, matrix compression techniques can be applied to facilitate use of the projection operator within memory storage and memory transfer constraints.

Consequently, the direct application method can be further enhanced using compression. In one example, the projection precomputation algorithm 300 can be configured to compress the projection operator matrix to reduce a memory footprint of a memory (e.g., a graphics processor unit (GPU) memory, a RAM, a hard disk drive, a cloud computing environment). That is, the projection operator matrix can be compressed to fit in a scale suitable for a particular memory.

In one example, the projection precomputation algorithm 300 can be further configured to compress the projection operator matrix using at least one of: coordinate format (COO), compressed sparse row (CSR), compressed sparse column (CSC), ELLPACK (ELL), the like, or a combination thereof.

Various kinds of compression techniques can be used to compress the forward projection operator matrix and the back projection operator matrix. Some example compression techniques include the Coordinate Format (COO), Compressed Sparse Row (CSR) format and derived Compressed Sparse Column (CSC) formats, ELLPACK, as well as more computationally intensive compression algorithms. These compression techniques operate based on the assumption that the number of non-zero components in the matrix is significantly less than the total size of the matrix (e.g., on the order of 90-99% zero-valued weights).

Coordinate format can implement matrix compression by direct storage of column, row, and value information. For every value in the matrix, the corresponding column and row can be stored. Thus, COO compression can reduce a large sparse matrix from size m*n to be equal to [(number of non-zero components)×(weight representation in bytes)]+[(number of non-zero components)×(2× column and row representation size in bytes)].

The CSR method can be used to further compress a matrix beyond COO compression. The non-zero values can be stored in a list with the corresponding column index for CSR. The row information can be compressed in a series of pointers indicating the start of each row. Thus, the size can be further compressed to be equal to [(number of non-zero components)×(weight representation in bytes)+[(number of non-zero components)×(column representation size in bytes)]+[n×(row representation in bytes)].

The ELLPACK (ELL) format can be used to compress the forward projection operator or the back projection operator into representation as a sparse matrix. The matrix data can be aligned to be a matrix including non-zero elements, with non-equal element rows padded with zero elements. The corresponding column indices can be aligned to a matrix of identical dimensions.

The ray-driven method can generate rows that have equivalent numbers of non-zero elements as each ray operation along the ray originating at some pixel (u, v) fetches the equivalent number of elements. Therefore, a blocked compression method does not provide a significant performance difference compared to other compression techniques.

In another example, the direct application method can be further enhanced using sparse matrix storage. In one example, the projection precomputation algorithm 300 can be configured to store the projection operator matrix in the memory (e.g., a graphics processor unit (GPU) memory, a RAM, a hard disk drive, a cloud computing environment) as a sparse matrix. In one example, the coefficients for the projection operator matrix (e.g., a forward projection operator or a back projection operator) can be stored in a low number of bits (e.g., 8-bits). In another example, the projection operator matrix (e.g., a forward projection operator or a back projection operator) can be stored as a sparse matrix, the size of which can decrease based on a factor η. In yet another example, the projection operator matrix (e.g., a forward projection operator or a back projection operator) can be reduced to eigenvalues or using a different matrix preconditioning technique.

As depicted in FIG. 3, the projection precomputation algorithm 300 can be configured to parallelize a computation using a parallelized level computation reduction, as depicted in operation 304. For example, a parallelized level computation reduction can use a parallelization, which can be a set of 32 threads within a thread block such that all threads in the parallelization execute the same instruction. In one example, the projection precomputation algorithm can be configured to accelerate matrix-vector multiplication using the projection operator matrix using at least one of: memory coalescing, compressed sparse row (CSR) compression, a parallelized level instruction set, or a combination thereof. More generally, the projection precomputation algorithm can be configured to precondition the projection operator matrix for accelerated matrix-vector multiplication. In one example, the forward projection operator matrix can be compressed using CSR compression, as depicted in operation 306.

With the utilization of CSR format for A and the corresponding CSC format for $A^T$, operations can occur on a cascading parallelized (e.g., warp or wavefront)) index architecture such that the memory access for a parallelization of 32 threads is coalesced along the given axis. Each thread block of 32 can compute the output value at some row index. Matrix vector multiplication can be represented with the following computation: each output row o[n] can be the result of the summation of the input vector at row m multiplied by the corresponding matrix value as row m, column n, e.g.

$$o[n] = \sum_{i=0}^{n} M[n][m] * V[m]$$

For memory access implementation on a GPU, the most efficient utilization of memory reads can occur along the parallelization such that each thread within a parallelization reads at an offset of continuous memory. This allows the instruction multiprocessor to efficiently access data for the entire parallelization. The parallelization coalescence can pair with the CSR compression because the number of elements per row can remain constant without a multiprocessor delay due to branching. The kernel operation can perform a parallelization reduction for each of the individual summations along the subsections, which can be performed with the parallelization level instruction sets.

The projection precomputation algorithm 300 can be configured to generate a multi-iteration projection operator based on the projection operator matrix. In one example, the projection precomputation algorithm can be configured to: generate the back projection operator matrix (e.g., $A^T$) as depicted in operation 308, and generate the multi-iteration back projection operator matrix, M, as depicted in operation 310.

The multiple iterations can comprise a plurality of transpose operations, addition operations, and multiplication operations to propagate the precomputed weights, using lambda as a convergence parameter, as shown.

$$\epsilon = 1\lambda A^T(p-Ax_1) = \lambda A^T(p-A(\lambda A^T p)) = (\lambda A^T - \lambda^2 A^T A A^T)p$$

$$x_2 = x_1 + \epsilon = \lambda A^T p + (\lambda A^T - \lambda^2 A^T A A^T)p = (2\lambda A^T - \lambda^2 A^T A A^T)$$
$$p = Mp$$

Because the multi-iteration projection operator, M, can be represented as a less sparse matrix compared to the projection operator, A, therefore M can have a larger size when stored as a sparse matrix. Therefore, various constraints can be applied using matrix component separation for an approximation of multiple iterations. Other techniques can include matrix decomposition, general matrix optimization, or the like.

When the precomputation has been performed, the multi-iteration operator can be applied to the projection measurements to generate multiple iterations in a single operation, which can highly accelerate the reconstruction. Subsequent iterations can be resolved with a forward projection of the output volume, subtraction against the projection measurements, the application of the multi-iteration operator to the error, and the addition of the delta into the output. The multi-iteration projection operator, M, used between these multi-iteration single multiplication operations (e.g., macros stages) can vary to accommodate different lambda coefficients at different stages of the reconstruction.

Thresholding the multi-iteration back projection operator matrix can enhance the rapidity of the operations. The image reconstruction algorithm can be configured to threshold the multi-iteration back projection matrix, M, as depicted in operation 312. The threshold multi-iteration back projection matrix, M, can be compressed and/or stored, as depicted in 313. In one example, the image reconstruction algorithm can be further configured to compress the multi-iteration projection operator using: thresholding to generate a threshold multi-iteration projection operator, and binning to generate a binned multi-iteration projection operator. The image reconstruction algorithm can be further configured to up-sample the volume, x, which can be computed using the multi-iteration back projection operator matrix, M, as depicted in operation 314.

Generating a seed volume can enhance the efficiency of the computation. The projection precomputation algorithm can be configured to generate an initial reconstructed three-dimensional image for a subsequent reconstructed three-dimensional image that uses a Jacobi iteration algorithm, as depicted in operation 316. In some examples, the initial condition of zero can be used as a seed volume. However, a multi-iteration projection operator matrix can be based on various seed solutions. The Jacobi iteration algorithm can be used as part of the projection precomputation algorithm, as depicted in block 318.

The resolution of storage for the projection operator matrices can affect the memory loading and memory access duration. In one example, the projection precomputation algorithm can be configured to store the projection operator matrix in the memory at a resolution that is less than a pre-storage resolution of the projection operator matrix.

In one implementation, there can be at least two resolutions. A hyper resolution projection model can be used to generate the matrix, and a lower resolution can be used to store the matrix. This bifurcation can reduce the size of the matrix and reduce aliasing that can result from a coarse projection model. The operations can be implemented as computer-readable instructions depicted in the proceeding.

// Create high resolution grid forward projector x, y, z, u, v, phi
// Create a coarse resolution grid A matrix X, Y, Z, U, V, Z
// Run the forward projector and accumulate the coefficients in A
// . . . x*y*z*phi*u*v>X*Y*Z*PH*V*U*

In some examples, the 3D object reconstruction can be Cone Beam CT or Tomosynthesis. However, CT slices (e.g., 2D reconstructions) or other reconstructions that may or may not be based on X-rays can also use these techniques.

In some cases, the projection precomputation algorithm can be configured to compress the projection operator matrix based on storing smooth-varying parameters and dynamically computing fast-varying parameters based on a model. That is, the smooth-varying parameters can be preserved because of the comparative resistance to change while the fast-varying parameters, being conducive to variation, can be computed dynamically. This division of computational resources can reduce the number of total operations and thus enhance performance.

The forward projection operator, A, can be processed to reduce its size and enhance the performance time of the computation by using lossless or lossy compression techniques. Specifically, A can be compressed based on smooth varying parameters, and fast varying models. The smooth varying parameters can be quickly accessible via a texture, possibly by sampling at a lower resolution or by reducing to a model of smaller size than the size of A. Fast varying models (e.g., wavelets, sincs, sawtooths, and the like) can be dynamically computed and not fully stored in memory.

In other examples, the projection precomputation algorithm can be further configured to compress the projection operator matrix based on storing regional parameters calculated from voxel-center traversing rays and dynamically computing local parameters calculated from non-voxel center traversing rays. For example, the contribution of a voxel into a pixel can be at a maximum when the ray traverses the voxel at the voxel's center, and the contribution of adjacent rays in the grid can be a minimum. As the ray deviates from the center, the contribution of the voxel into a pixel decreases, while the contribution of the adjacent ray to the pixel increases. The voxel-center traversing rays can be maintained as matrix elements and the non-voxel center traversing rays can be estimated dynamically based on the voxel-center traversing rays in the region.

In some other examples, the projection precomputation algorithm can be further configured to decompose the projection operator matrix into component projection operator matrices based on at least one of resolution, computation time, storage time, and a combination thereof. In some examples, the projection operator matrices can be separated into partial matrices based on precomputed metrics, such as thresholds. In one example, component matrices can generate approximations of the forward projection, with the summation of all component operators equaling the original projection operator e.g., $\Sigma(Bix)=Ax$. In another example, based on weight distributions, certain component matrices can be prioritized within a time constraint to: achieve close approximations of Ax in a short time, and perform matrix multiplication and recombination at a later time to reduce image latency.

The projection precomputation algorithm can be modeled using different coordinate systems. In some other examples, the projection precomputation algorithm can be further configured to map the plurality of projection measurements into a polar coordinate grid comprising a rotationally invariant matrix and a rotationally variant matrix. The grid can be specifically defined to maximize the modeling or compression of the matrix (e.g., A or M). In another example, the projection precomputation algorithm can be further configured to map the plurality of projection measurements into a Cartesian coordinate grid.

The nView™ tomosynthesis system can use the projection precomputation algorithm to generate a reconstructed three-dimensional image. In one example, with the nView™ tomosynthesis system nView™ s1, which can be symmetrical along an axis of rotation, the projections can be mapped into a polar coordinate set of images (e.g., alpha, rho, phi versus u, v, phi), and the object discretization can be cylindrical. In this case, the nominal geometry matrix can be invariant with phi. A decomposition into two matrices can be envisioned, with a matrix having a lower rank (i.e., without phi) for the nominal geometry, and a matrix representing variations around that nominal matrix to include factors correcting for the non-ideal variations of the geometry (e.g., not fully invariant around an axis).

The projections can also be mapped in other ways. In one example, the projection precomputation algorithm can be further configured to model parallel detector panel planes as square patterns. In one example, a square pattern can be used for each z-slice (with z being the planes parallel to the detector panel). The grid can be changed at each z-operation to ease compression of A or M.

In another example, the projection precomputation algorithm can be configured to apply the multi-iteration operator to generate the reconstructed three-dimensional image using a plurality of iterative operations to enhance computational efficiency. For example, applying the multi-iteration operator to generate the reconstructed three-dimensional image can be divided into different iterative stages so that a reconstruction regularizer operator can be applied to generate the back projection matrix after the plurality of iterative operations has commenced and before the plurality of iterative operations has been completed. Dividing the computational operations in this way can enhance the computational efficiency.

Applying a regularizer operator can enhance the image quality. In some examples, the image reconstruction algorithm can be further configured to apply a regularizer operator to generate the reconstructed three-dimensional image. In some examples, regularization can be used in conjunction with multi-iteration acceleration. Regularization models can also be used to adjust the projection operators as more information about the reconstruction is provided. Because of the high cost of the computation, a cloud computing environment can be used to expedite the computation.

In the operations provided herein, the projection precomputation algorithm can be used with an image reconstruction algorithm to reconstruct the three-dimensional image using at least one of a ray-driven projection, a distance-driven projection, a stochastic projection, the like, or a combination thereof.

Figure 4:
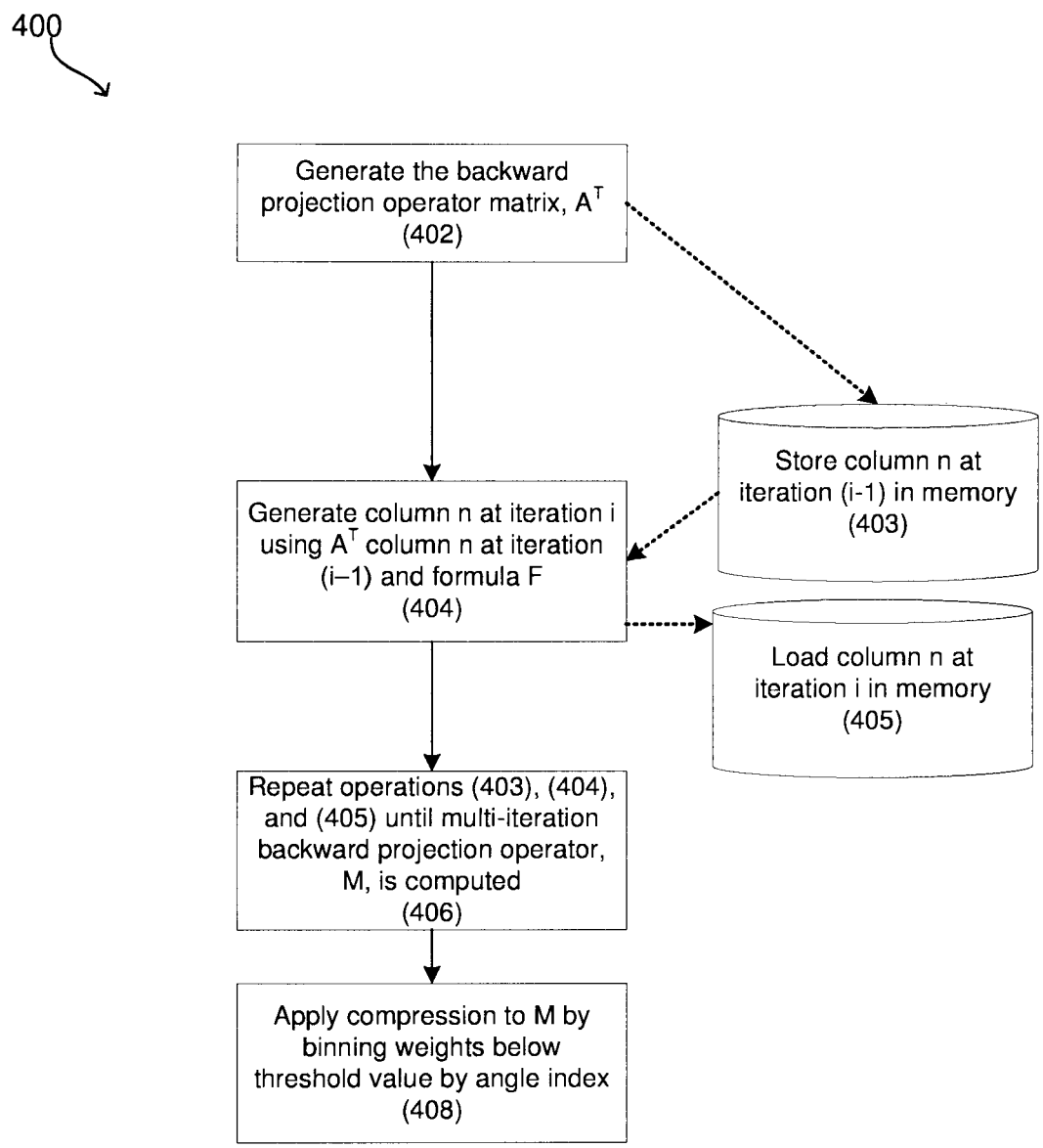
FIG. 4 is a block diagram that illustrates an example generation of a multi-iteration projection operator for use in reconstructing a three-dimensional image of an object.

FIG. 4 further illustrates the projection precomputation algorithm 400 using the multi-iteration projection operator. As depicted in operation 402 and 403, the projection precomputation algorithm 400 can be configured to generate the back projection operator matrix, $A^T$, and store column n at iteration (i−1) of the back projection matrix, $A^T$ in memory (e.g., global GPU memory).

The projection precomputation algorithm 400 can be configured to generate the multi-iteration back projection operator matrix, M, as a series of column vector multiplications. That is, to generate the multi-iteration back projection operator matrix, column multiplication was applied recursively. The base case for the multi-iteration back projection operator is the back projection operator, $A^T$, and each subsequent iteration was calculated as either a CSR compression or a CSC compression of the recursively generated column. Therefore, a column at a particular iteration i was computed from the stored multi-iteration back projection operator matrix multiplied by the previous column using a formula matrix $F_i$ at iteration i comprising a series of $A^T A A^T A$ operations.

Therefore, the projection precomputation algorithm 400 can be configured to generate column n at iteration i using $A^T$ column n at iteration (i−1) and Formula F, as depicted in operation 404. Operation 404 can compute the matrix, $A^T$, column n at iteration (i−1). The matrix, $A^T$, column n can be loaded at iteration i into memory (block 405).

The projection precomputation algorithm 400 can be configured to repeat operations 403, 404, and 405 until the multi-iteration back projection operator, M, is computed, as shown in operation 406. Compression can be applied to M by binning weights below the threshold value by angle index, as shown in operation 408.

FIG. 5 is a block diagram that illustrates an example imaging system 502 configured to reconstruct a three-dimensional object using a projection operator matrix and an iterative reconstruction technique. As illustrated, the imaging system 502 can include an imaging modality 510 configured to generate a projection image dataset for a three-dimensional object, a computing device 512 used to host various modules associated with generating and displaying image reconstructions of a three-dimensional object, and a display device 514 used to display the image reconstructions of the three-dimensional object.

The components of the imaging system 502 can be contained in a workstation, or the components of the imaging system 502 can be located separately and can be configured to communicate with one another over a network (e.g., local area network (LAN), wide area network (WLAN), short range network protocol, or cellular network such as 4G or 5G, etc.). Illustratively, the imaging system 502 can be a CT-Scanner or CBCT imaging system. The imaging modality 510 can be any imaging device that incorporates, for example, imaging technologies of computed tomography, radiography, fluoroscopy, and x-ray tomosynthesis, although other technologies such as elastography, tactile imaging, thermography, and/or medical photography and nuclear medicine functional imaging techniques as positron emission tomography (PET) and single-photon emission computed tomography (SPECT) could also be used. In one example, the imaging modality 510 can be a computed tomography (CT) scanner or a tomosynthesis system. As will be appreciated, imaging modalities that are not specifically described herein are also within the scope of this disclosure. For example, imaging systems such as those described in U.S. Pat. No. 10,070,828, U.S. Application Publication No. 2017-0200271-A1 (issued as U.S. Pat. No. 10,846,860), PCT Application Publication No. WO 2019/060843, and PCT Application Publication No. WO 2020/056426 (all of which are incorporated herein by reference) are particularly effective systems for image reconstruction.

The computing device 512 can comprise a processor-based system and can include any such device capable of receiving projection image data from an imaging modality 510 and outputting reconstructed projection image data to the image display module 508, as well as hosting the projection operator module 504 and the image reconstruction module 506. The projection operator module 504, when executed on the computing device 512, can be configured to generate a forward projection operator or a back projection operator. The projection operator matrix can be generated and stored in memory before an image reconstruction module 506 operation.

The image reconstruction module 506, when executed on the computing device 512, reconstructs an image of a three-dimensional object using an iterative reconstruction technique applied to a reduced image dataset and image remainder dataset received from an image decomposition module. The image reconstruction module 506 generates a first scale image reconstruction of the three-dimensional object using the reduced image dataset and generates a second scale image reconstruction of the three-dimensional object using an image remainder dataset. As the first and second scale image reconstructions are generated, the image reconstruction module 506 generates a multi-scale image reconstruction of the three-dimensional object using the first scale image reconstruction and the second scale image reconstruction.

As indicated above, the image reconstruction module 506 generates the image reconstructions (i.e., a first, second, and multi-scale image reconstructions) using an iterative reconstruction technique. In one example, the iterative reconstruction technique includes the operations of (i) forward projecting a ground truth image volume to produce a two-dimensional set of projection images, (ii) determining a difference between the projection image dataset and the two-dimensional set of projection images, (iii) generating an update volume by back projecting the difference into a three-dimensional space, and (iv) incorporating the update volume into a reconstruction of the image of the three-dimensional object. In one example, a regularizer can be used to introduce object features and constraints (e.g., densities, borders, curves, etc.) into the image of the three-dimensional object being reconstructed. In at least one example, a machine learning model can be used as a regularizer. For example, after one or more iterations of the reconstruction process, output of the machine learning model can be provided as input to a next iteration of the reconstruction process. In some examples, a plurality of machine learning models can be used as regularizers at different stages of the iterative reconstruction technique.

Image reconstructions (i.e., a first, second, and multi-scale image reconstructions) generated by the image reconstruction module 506 can be provided to the image display module 508 configured to output the image reconstructions to a display device 514, including a monitor, mobile device, or other type of display for presentation of the reconstructed image to a user, such as a medical professional. In one example, image reconstructions can be provided to the image display module 508 directly after being generated to reduce a latency associated with generating higher quality image reconstructions. As an example, the image reconstruction module 506 can provide a first scale image reconstruction to the image display module 508 for display on the display device 514 as soon as the first scale image reconstruction is ready. Subsequently, image reconstruction module 506 can provide a second scale image reconstruction, and thereafter, a multi-scale image reconstruction, to the image display module 508 for display on the display device 514 in order to increase resolution, field of view, and/or image depth of an image reconstruction of a three-dimensional object. Visualization of the three-dimensional object provided by the image display module 508 can include slicing of volumetric data, three-dimensional rendering, projections, and the like.

Figure 6:
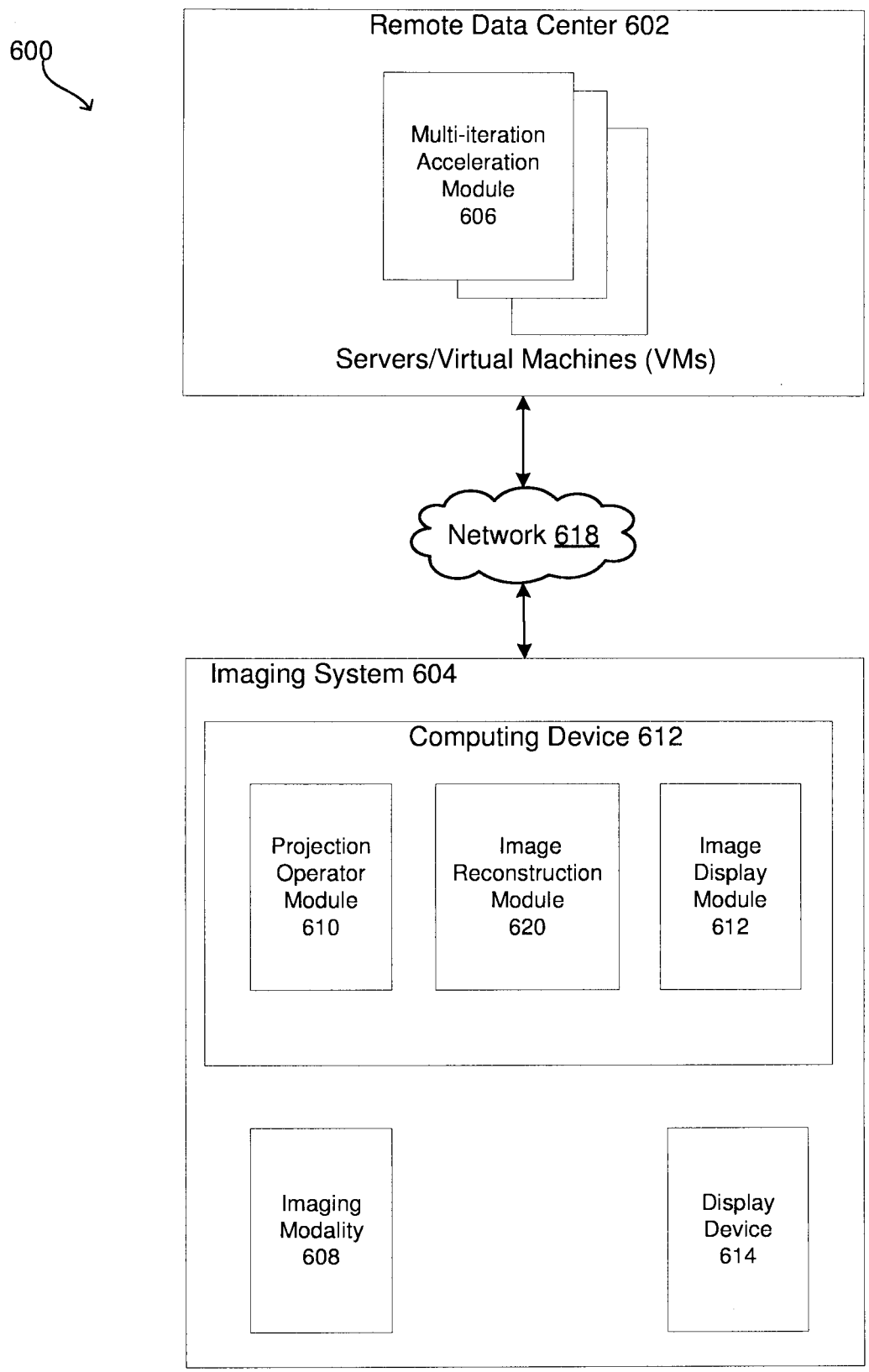
FIG. 6 is a block diagram that illustrates an example system which includes an imaging system which is in network communication with computing resources in a remote data center.

FIG. 6 is a block diagram that illustrates an example system 600 which includes an imaging system 604 as described in relation to FIG. 5 which is in network communication with computing resources in a remote data center 602 (e.g., a "cloud" computing environment). In this example, the imaging system 604 can include an imaging modality 608 configured to generate a projection image dataset for a three-dimensional object, a computing device 612 used to host various modules associated with generating and displaying image reconstructions of a three-dimensional object, and a display device 614 used to display the image reconstructions of the three-dimensional object.

The computing device 612 can host a projection operator module 610, an image reconstruction module 620, and an image display module 612. The projection operator module 604, when executed on the computing device 612, can be configured to generate a forward projection operator or a back projection operator. The projection operator matrix can be generated and stored in the memory before an image reconstruction module 620 operation.

The remote data center can include computing resources for hosting instances of the multi-iteration acceleration module 606. The computing resources can include servers and/or virtual machines executed on servers. Data for generating a multi-iteration projection operator can be sent between the remote data center 602 and the imaging system 604 over a network 618. The network 618 may include any useful computing network, including an intranet, the Internet, a local area network, a wide area network, a wireless data network, or any other such network or combination thereof. Components utilized for such a network 618 may depend at least in part upon the type of network and/or environment selected. Communication over the network may be enabled by wired or wireless connections and combinations thereof.

The multi-iteration acceleration module 606 hosted on the remote data center 602, when executed, may be used to reconstruct an image of a three-dimensional object using a reconstruction technique applied to a reduced image dataset and image remainder dataset received from the image decomposition module 610. A reconstruction module (not shown) generates a first scale image reconstruction of the three-dimensional object using the reduced image dataset and generates a second scale image reconstruction of the three-dimensional object using the image remainder dataset. Generation of reconstruction images can be performed in parallel using multiple instances of the reconstruction module (not shown). After generating a reconstruction image (e.g., a first or second scale image reconstruction), the reconstruction module (not shown) sends the first and second scale image reconstructions to the multi-scale reconstruction module 620 located in the imaging system 604 to allow the multi-scale reconstruction module 620 to generate a multi-scale image reconstruction of the three-dimensional object for display on the display device 614.

Figure 7:
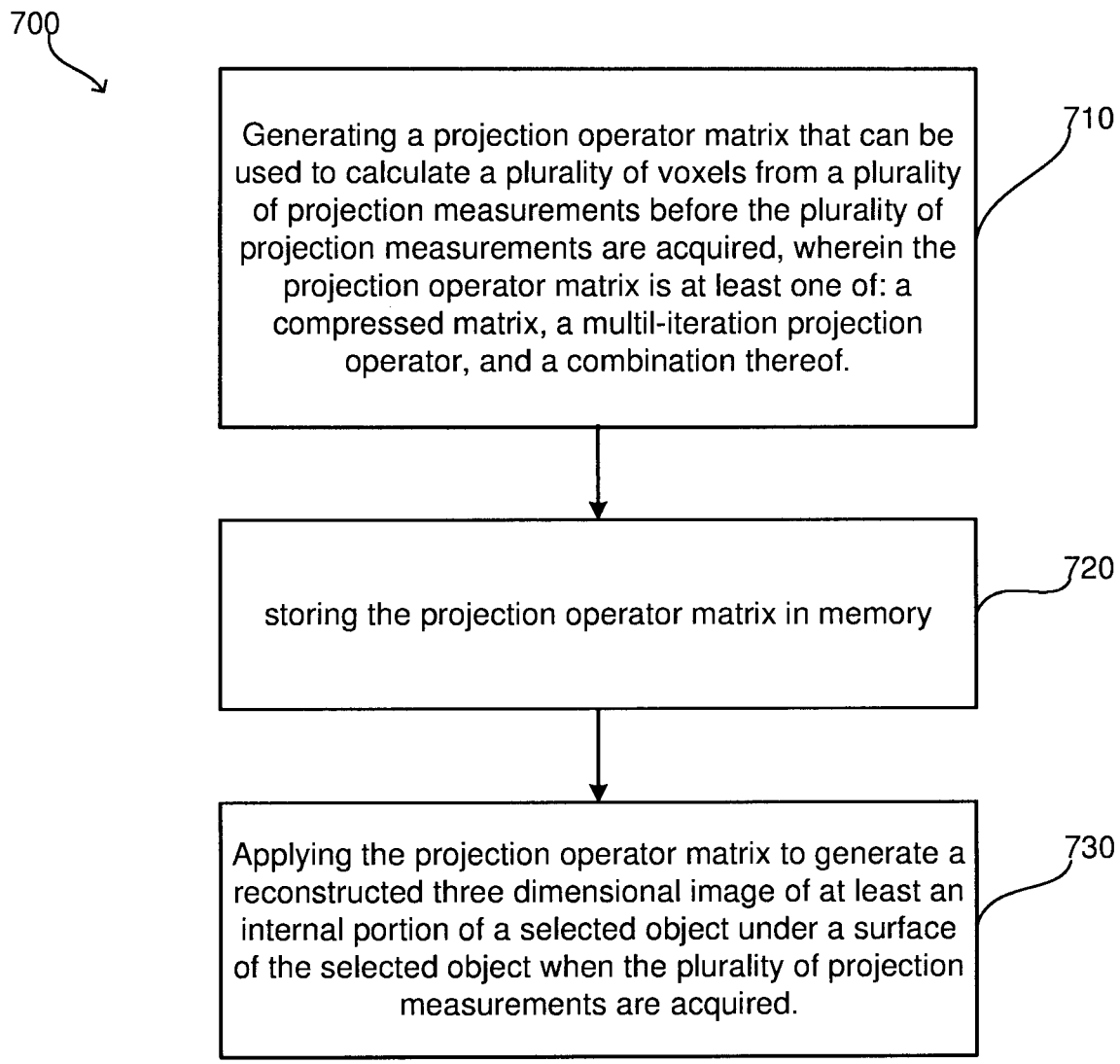
FIG. 7 is a flow diagram illustrating an example method for reconstruction of a three-dimensional object using a projection operator.

FIG. 7 is a flow diagram illustrating an example method 700 for x-ray tomography reconstruction. As depicted in block 710, the method 700 can comprise generating a projection operator matrix that can be used to calculate a plurality of voxels from a plurality of projection measurements before the plurality of projection measurements are acquired, wherein the projection operator matrix is at least one of: a compressed matrix, a multi-iteration projection operator matrix, and a combination thereof. As depicted in block 720, the method 700 can comprise storing the projection operator matrix in memory. As depicted in block 730, the method 700 can comprise applying the projection operator matrix to generate a reconstructed three-dimensional image of at least an internal portion of a selected object under a surface of the selected object when the plurality of projection measurements are acquired.

In one example, the method can comprise accelerating matrix-vector multiplication using the projection operator matrix using at least one of: memory coalescing, compressed sparse row (CSR) compression, a parallelized level instruction set, and a combination thereof. In another example, the method can comprise generating a multi-iteration projection operator based on the projection operator matrix. In another example, the method can comprise compressing the multi-iteration projection operator using thresholding to generate a threshold multi-iteration projection operator, and binning to generate a binned multi-iteration projection operator. In another example, the method can comprise generate an initial reconstructed three-dimensional image for a subsequent reconstructed three-dimensional image that uses a Jacobi iteration algorithm. In another example, the method can comprise storing the coefficients for the projection operator matrix in 8 bits or less; or compress the projection operator matrix using at least one of: coordinate format (COO), compressed sparse row (CSR), compressed sparse column (CSC), ELLPACK (ELL), or a combination thereof.

In another example, the method can comprise using the projection operator matrix at a full resolution to generate an initial reconstructed three-dimensional image and store the projection operator matrix at a resolution that is less than the full resolution. In another example, the method can comprise compressing the projection operator matrix based on storing smooth-varying parameters and dynamically computing fast-varying parameters based on a model. In another example, the method can comprise compressing the projection operator matrix based on maintaining regional parameters calculated from voxel-center traversing rays and dynamically computing local parameters calculated from non-voxel center traversing rays.

In another example, the method can comprise decomposing the projection operator matrix into component projection operator matrices based on at least one of: resolution, computation time, storage time, and a combination thereof. In another example, the method can comprise mapping the plurality of projection measurements into a Cartesian coordinate grid; mapping the plurality of projection measurements into a polar coordinate grid comprising a rotationally invariant matrix and a rotationally variant matrix; or modeling parallel detector panel planes as square patterns; or a combination thereof. In another example, the method can comprise using the projection precomputation algorithm to reconstruct the three-dimensional image using at least one of a ray-driven projection, a distance-driven projection, a stochastic projection, or a combination thereof. The method can further comprise applying a regularizer operator to generate the projection operator matrix.

In another example, the method can comprise applying the projection operator matrix (e.g., the multi-iteration operator) to generate the reconstructed three-dimensional image using a plurality of iterative operations to enhance computational efficiency. In one example, the method can comprise applying the projection operator matrix (e.g., the multi-iteration operator) to apply a reconstruction regularizer operator to generate the reconstructed three-dimensional image during the plurality of iterative operations.

In another example, a non-transitory machine-readable storage medium can include instructions embodied thereon, wherein the instructions, when executed by at least one processor: generate a projection operator matrix that can be used to calculate a plurality of voxels from a plurality of projection measurements before the plurality of projection measurements are acquired, wherein the projection operator matrix is at least one of: a compressed matrix, a multi-iteration projection operator matrix, and a combination thereof. The instructions, when executed by the at least one processor, can store the projection operator matrix in memory. The instructions, when executed by the at least one processor, can apply the projection operator matrix to generate a reconstructed three-dimensional image of at least an internal portion of a selected object under a surface of the selected object when the plurality of projection measurements is acquired.

Figure 8:
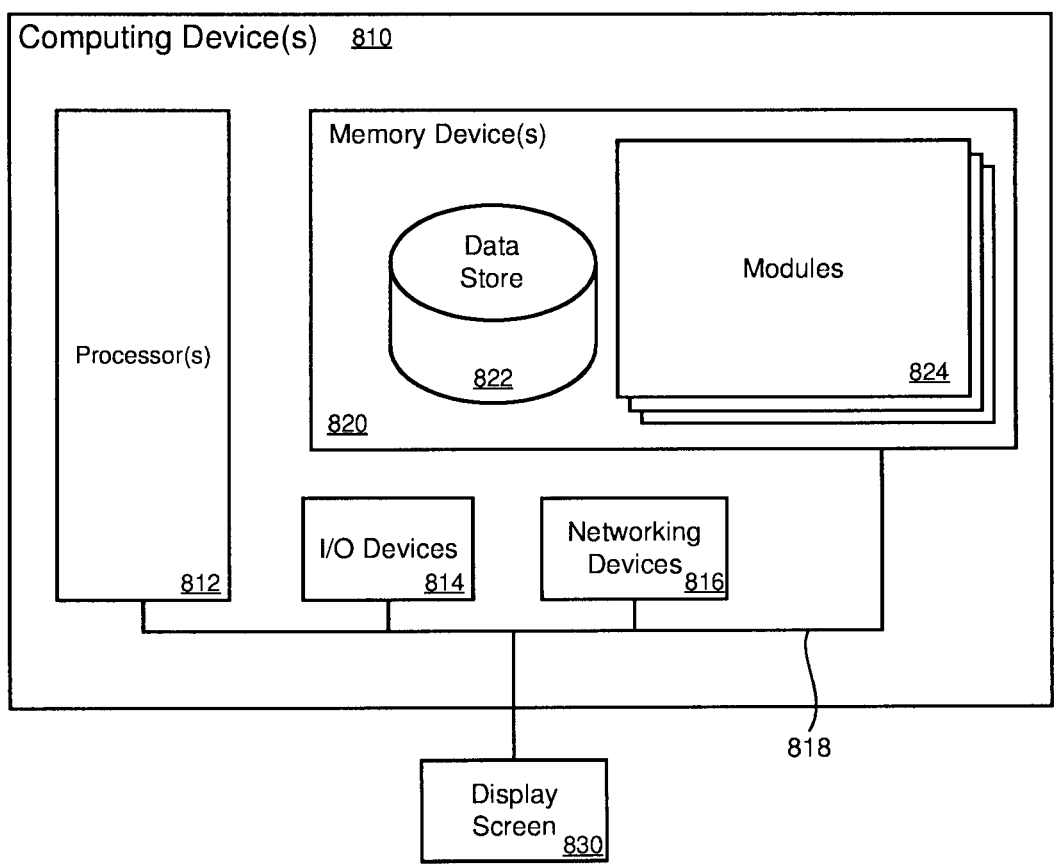
FIG. 8 is block diagram illustrating an example of a computing device that may be used to execute a method for tomographic reconstruction of a three-dimensional object using a projection operator.
Figure 9A:
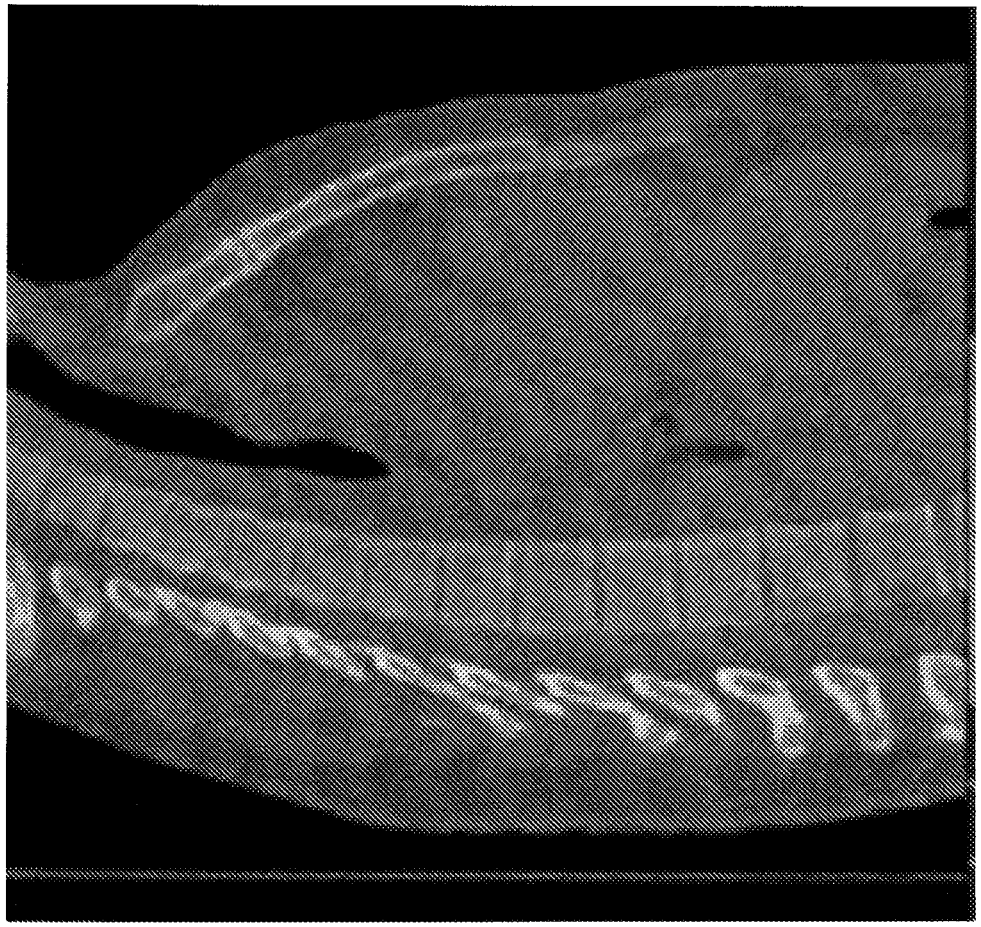
FIG. 9A-D illustrate volume slices of computerized tomography (CT) used as input for simulated projections.
Figure 9B:
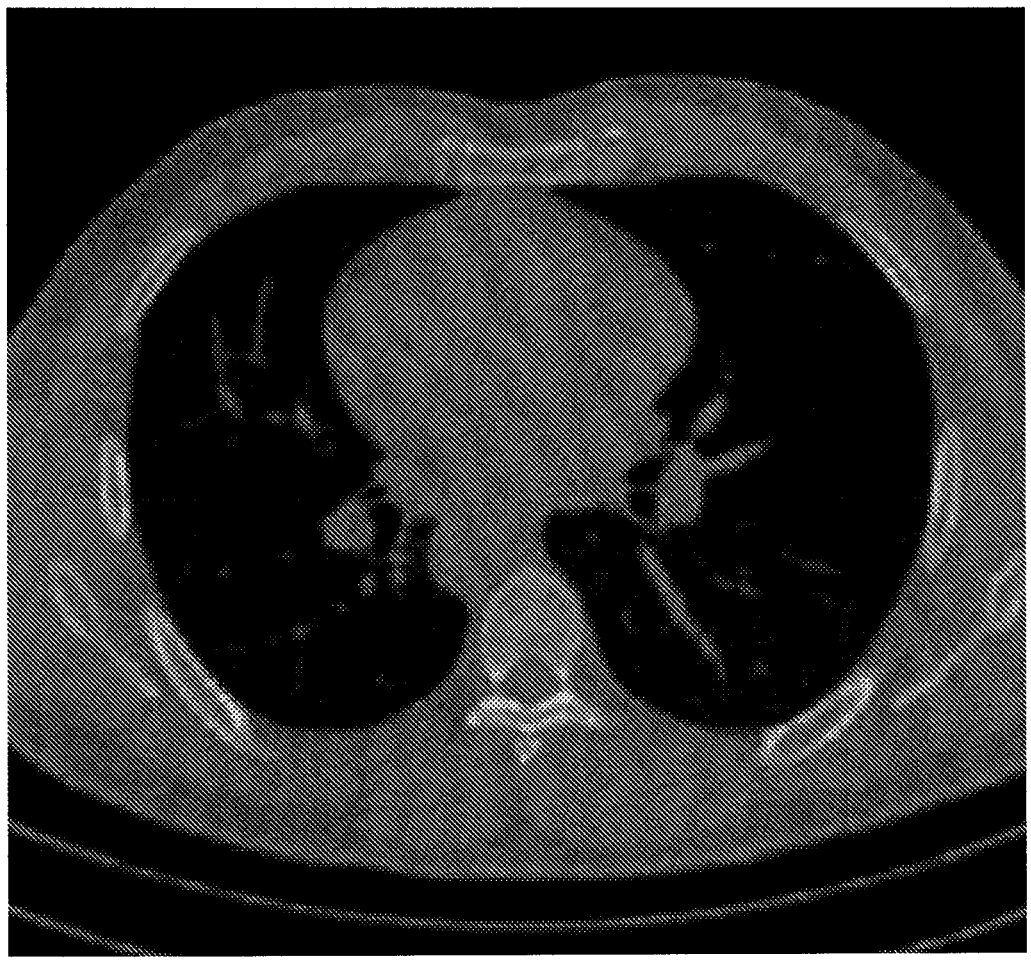
Figure 9C:
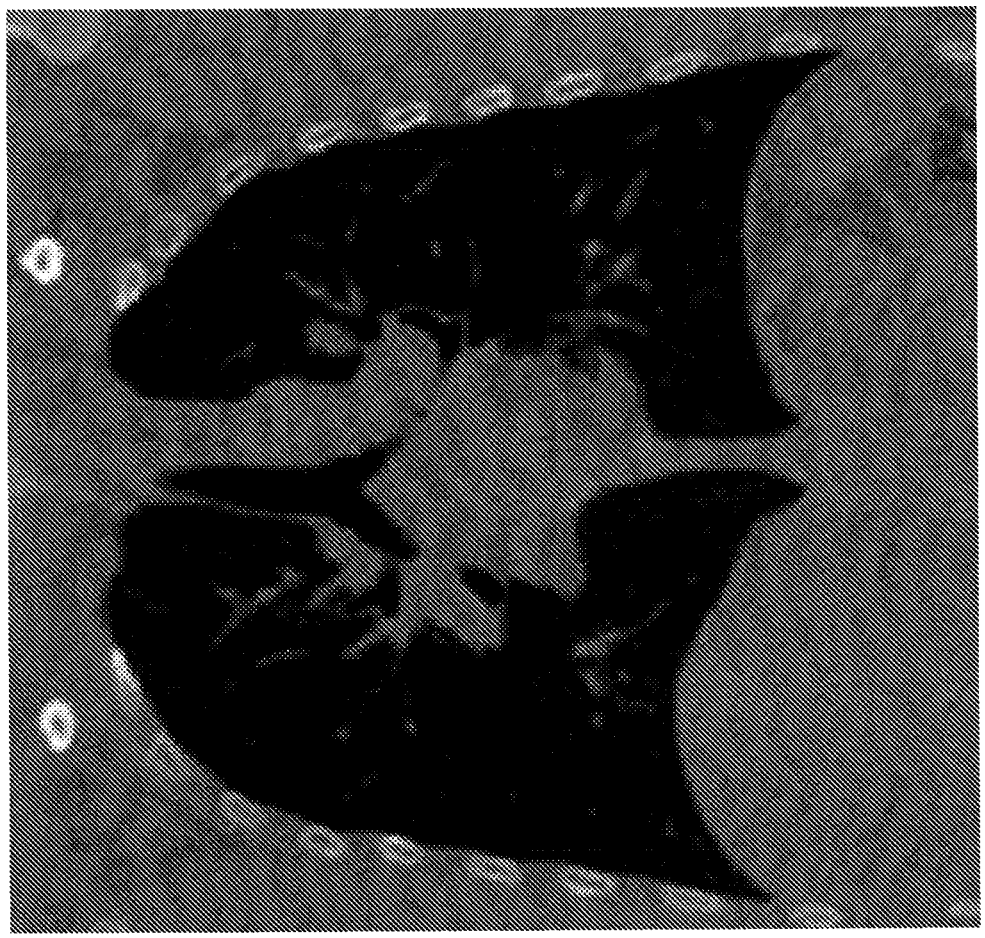
Figure 9D:

FIG. 8 illustrates a computing device 810 on which service modules of this technology can execute. A computing device 810 is illustrated on which a high-level example of the technology can be executed. The computing device 810 can include one or more processors 812 that are in communication with memory devices 820. The computing device 810 can include a local communication interface 818 for the components in the computing device. For example, the local communication interface 818 can be a local data bus and/or any related address or control busses as may be desired.

The memory device 820 can contain modules 824 that are executable by the processor(s) 812 and data for the modules 824 to provide various services. In one aspect, the memory device 820 can include a projection operator module, an image decomposition module, a reconstruction module, a multi-scale reconstruction module, an image display module, and other modules. A data store 822 can also be located in the memory device 820 for storing data related to the modules 824 and other applications along with an operating system that is executable by the processor(s) 812.

Other applications can also be stored in the memory device 820 and can be executable by the processor(s) 812. Components or modules discussed in this description that can be implemented in the form of software using high-level programming languages that are compiled, interpreted, or executed using a hybrid of the methods.

The computing device can also have access to I/O (input/output) devices 814 that are usable by the computing devices. An example of an I/O device is a display screen 830 that is available to display output from the computing device 810. Networking devices 816 and similar communication devices can be included in the computing device. The networking devices 816 can be wired or wireless networking devices that connect to the internet, a LAN, WAN, or other computing network.

The components or modules that are shown as being stored in the memory device 820 can be executed by the processor(s) 812. The term "executable" may mean a program file that is in a form that can be executed by a processor 812. For example, a program in a higher-level language can be compiled into machine code in a format that can be loaded into a random access portion of the memory device 820 and executed by the processor 812, or source code can be loaded by another executable program and interpreted to generate instructions in a random access portion of the memory to be executed by a processor. The executable program can be stored in any portion or component of the memory device 820. For example, the memory device 820 can be random access memory (RAM), read only memory (ROM), flash memory, a solid-state drive, memory card, a hard drive, optical disk, floppy disk, magnetic tape, or any other memory components.

The processor 812 can represent multiple processors, including, but not limited to Central Processing Units (CPUs), Graphical Processing Units (GPU), FPGAs, quantum computers, or clusters of the above, and the memory device 820 can represent multiple memory units that operate in parallel to the processing circuits. This can provide parallel processing channels for the processes and data in the system. The local communication interface 818 can be used as a network to facilitate communication between any of the multiple processors and multiple memories. The local communication interface 818 can use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. The low energy fixed location node, wireless device, and location server can also include a transceiver module (i.e., transceiver), a counter module (i.e., counter), a processing module (i.e., processor), and/or a clock module (i.e., clock) or timer module (i.e., timer). One or more programs that can implement or utilize the various techniques described herein can use an application programming interface (API), reusable controls, and the like. Such programs can be implemented in a high-level procedural or object-oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be incorporated into a single hardware circuit, or alternatively, the first hardware circuit and the second hardware circuit can be separate hardware circuits.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors, such as CPUs or GPUs, mixed environments, and clusters. An identified module of executable code may, for instance, comprise one or more blocks of computer instructions, which may be organized as an object, procedure, or function. Nevertheless, the executables of an identified module need not be physically located together but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

The following examples are provided to promote a clearer understanding of certain embodiments of the present disclosure and are in no way meant as a limitation thereon.

Example 1

For both the ray-driven and the distance driven operations, a projection can be a summation, for every pixel, over a series of weights multiplied by corresponding voxels. The weights and corresponding voxel locations can be precomputed at known angles to generate a sparse matrix that subsequent acquisitions of x-ray data can utilize to quickly compute a projection.

Methods:

The ray-driven operation was used to precompute a forward projection operator. The ray-driven method was selected to enhance the efficiency associated with sparse matrix multiplication in comparison to the distance-driven method (which increases the density of voxel to pixel relations).

Initially, the forward projection operator matrix, A, was pre-computed and the CUDA computation was parallelized by performing the parallelization level computation reduction. The parallelization level computation reduction used memory coalescing. By using a CSR format for the forward projection operator, A, and the corresponding CSC format for the back projection operator, $A^T$, all matrix operations occurred on a cascading parallelization index architecture to coalesce memory access for a parallelization of 32 threads along a selected axis. In this instance, each thread block of 32 computed the output value at the same row index.

After the entire forward projection operator matrix, A, was computed and CSR compression was applied, the computed matrix, A, was loaded into global GPU memory and applied to input projections. The projector match was verified using a constant value input projection stack and simulated CT scans. The simulated CT scans were generated by applying the Joseph method of projection to the CT computed volume, as shown in FIG. 9A to 9D.

Figure 11:
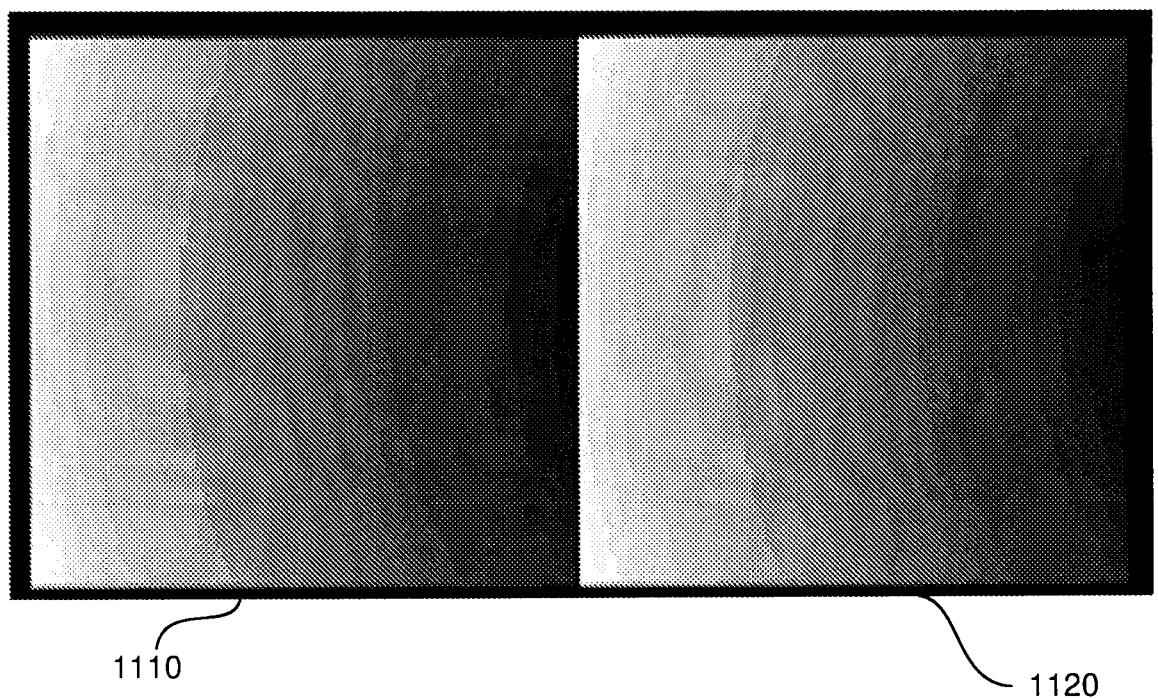
FIG. 11 illustrates projections comparing the distance driven methodology and the precomputed matrix methodology at a single angle of 30°.

Results:

The testing was done using Nvidia's™ visual profiler for speed optimizations. The base case used the distance-driven projector method and the test case used precomputation as disclosed. The system configuration was an Intel™ i9-10900X, 64 GB DDR4 RAM, Ubuntu™ 18.04.5 LTS with kernel version 4.15.0-112-generic, CUDA 11.4 with Nvidia™ driver 470.57.02, and compiled with distributed nvcc version 11.4. The weights, read, and write indices were stored in an initial kernel precomputation stage, with the forward projector kernel computation analyzed afterward. The forward projector was run 10,000 times for both test case and the base case to produce the same results for a volume consisting of ones for a single angle, as shown by FIG. 11 (1110 and 1120), for the simulated CT projections.

The resulting projection was matched for both methods. However, the timing showed that the test case slowed the kernel down from approximately 138 nanoseconds to 245 nanoseconds. Thus, the access time for reading in pre-calculated values and performing the atomic addition onto the projection plane used more time than performing the mathematical operations. Additionally, the amount of memory consumption in relation to the volume computation size was larger for the test case in comparison to the base case.

Conclusion

Directly applying the full projection operator matrix, as simulated using memory model predictions and applications, was slower than a baseline method. When enhanced with CSR compression and efficient matrix-vector multiplications, the Jacobi iteration method remained faster. As such, further investigation was conducted into compression techniques to overcome the memory access timing.

Example 2

The application of multi-iteration projection operators was investigated. The precomputation relating to A as set forth in Example 1 was expanded to include the voxel-to-pixel relations of an $n^{th}$ iteration using a methodology like that of a single iteration. That is, the $n^{th}$ iteration voxel, $x_n$, was defined to be equal to the product of the multi-iteration back projection operator, M, and the projection measurements, g, and consequently, $x_n=Mg$. In this case, the multi-iteration back projection operator, M, can be defined as the summation from f=1 to n of the product of: (i) a compression operator, $C_f$, (ii) the $f^{th}$ power of a convergence parameter (i.e., $\lambda^f$), (iii) the back projection matrix, $A^T$, and (iv) the $(f-1)^{th}$ power of the product of the forward projection operator (A) and the back projection operator ($A^T$). Based on this reasoning, the multi-iteration back projection operator can be defined such that:

$$M = \sum_{f=1}^{n} C_f \lambda^f A^T (AA^T)^{f-1}$$

Methods:

To generate the precomputed weights, the generation of the multi-iteration back projection operator matrix, M, was generalized into a series of column vector multiplications. That is, to generate the multi-iteration back projection operator matrix, column multiplication was applied recursively. The base case for the multi-iteration back projection operator is the back projection operator, $A^T$, and each subsequent iteration was calculated as either a CSR compression or a CSC compression of the recursively generated column. Therefore, a column at a particular iteration i was computed from the stored multi-iteration back projection operator matrix multiplied by the previous column using a formula matrix $F_i$ at iteration i comprising a series of $A^T A A^T A$ operations. Generally:

$$M_i = F_i M_{i-1}$$

For purposes of illustration, the formula matrix for the $2^{nd}$ iteration, $F_2$, can be determined as follows. The difference between the first iteration of the voxels in the reconstructed volume, $x_1$, and the second iteration of the voxels in the reconstructed volume, $x_2$, can be $\epsilon$, which can be further defined as the product of: (i) a convergence parameter, $\lambda$, (ii) the back projection operator matrix, $A^T$, and (iii) and the difference between the projection measurements, p, and the product of the forward projection operator matrix, A, and the first iteration of the voxels in the reconstructed volume, $x_1$. This relation can be equated as:

$$\epsilon = 1\lambda A^T(p-Ax_1) = \lambda A^T(p-A(\lambda A^T p)) = (\lambda A^T - \lambda^2 A^T A A^T)p$$

As a result, the second iteration of the voxels in the reconstructed volume, $x_2$, can be defined as the sum of the first iteration of the voxels in the reconstructed volume, $x_1$, and $\epsilon$ because of the definition of $\epsilon$. That is:

$$x_2 = x_1 + \epsilon$$

By noting that: (a) the first iteration of the voxels in the reconstructed volume, $x_1$, has been defined as the product of (i) the convergence parameter, $\lambda$, (ii) the back projection operator, $A^T$, and (iii) the projection measurements, p, to be $x_1 = \lambda A^T p$, it follows that:

$$x_2 = x_1 + \epsilon = \lambda A^T p + (\lambda A^T - \lambda^2 A^T A A^T)p = (2\lambda A^T - \lambda^2 A^T A A^T)$$
$$p = M_2 p$$

Therefore, it follows that: $M_2 = 2\lambda A^T - \lambda^2 A^T A A^T$ and because $M_1$ is $\lambda A^T$ and $M_2 = F_2 M_1$, then:

$$F_2 = 2 - \lambda A A^T$$

Consequently, matrix operations were reduced to a series of matrix-vector operations. Furthermore, space complexity was reduced because the matrix-vector operations at given time were computed using the forward projection operator, A, and a column vector in memory without using additional storage for other matrices or vectors. Therefore, precomputing multiple iterations enhanced computational performance because subsequent compression operations: (1) maximized data use efficiency using the projection operator matrix (which was based on data correlations from a ray projection derivation), and (2) maximized data use efficiency in the iteration dimension. Thus, for a provided application of $x_n = Mg$, the relative data complexity can be substantially reduced from the single-iteration projection operator (e.g., the forward projection operator, A, or the back projection operator, $A^T$) because multiple iterations were computed to eliminate redundancy of computational operations.

The compression technique applied was a thresholding of the matrix M. The weights below the threshold value were binned by angle index and applied as an additional operation in the iteration process. The $n^{th}$ iteration of the reconstructed volume, $x_n$, can be calculated as the sum of: (i) the product of the threshold components of M (i.e., $M_{threshold}$) and the projection measurements, and (ii) the product of the binned information, $V_{binned}$, and the binned projection data, $g_{binned}$. Thus:

$$x_n = M_{threshold} g + V_{binned} g_{binned}$$

Figure 10:
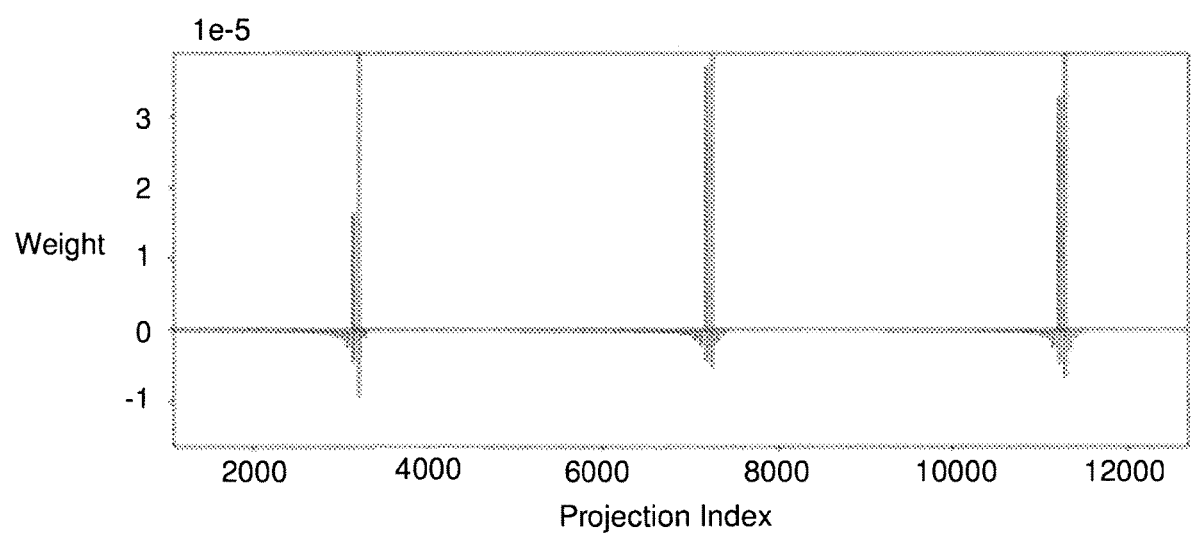
FIG. 10 illustrates matrix weight values for 1-dimensional panel pixel indices.

Results:

As shown in FIG. 10, a substantial amount of the results in subsequent iterations included small negative weights and large angular peaks. The large angular peaks resulted from $A^T$ calculations that were refined by subsequent iteration reductions from other ray-driven data. Thus, by thresholding the matrix, the density information was preserved, and the application of a compressed binned weight multiplied by the projection data reintroduced the remaining subtraction components. This methodology facilitated empty space density placement.

Figure 12:
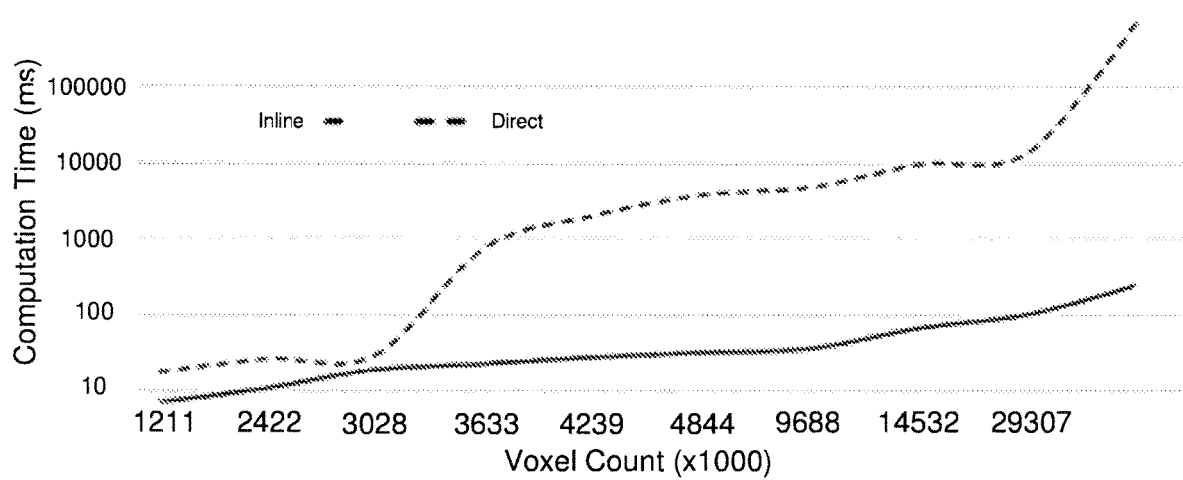
FIG. 12 illustrates the computation time (ms) for a single forward projection using the direct matrix methodology compared to the in-line ray projection methodology.

FIG. 12 displays a comparison between the computation time in milliseconds for a single iteration of the direct matrix operator methodology (displayed as broken lines) versus the in-line ray projector methodology (displayed as solid lines). The direct matrix operator methodology performed slower than the inline ray projector methodology for all experimental resolutions (e.g., voxel counts).

Furthermore, as shown in FIG. 12, there were two regions of substantially increased computational time when comparing the direct matrix operator methodology to the in-line ray projector methodology. The first region of substantially increased computational time occurred when the GPU cache streamline capabilities were exceeded, and the global GPU memory usage was commenced. The second region of substantially increased computational time occurred when the global GPU memory limit was exceeded, and unified CUDA memory usage was commenced.

Figure 13:
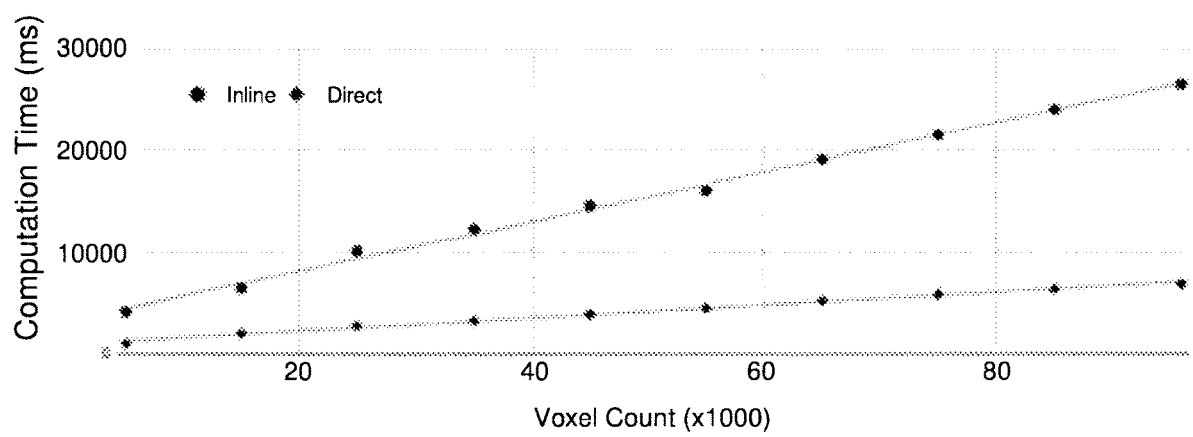
FIG. 13 illustrates the computation time for 40 iterations of the direct matrix methodology compared to the in-line ray projection method.
Figure 14:
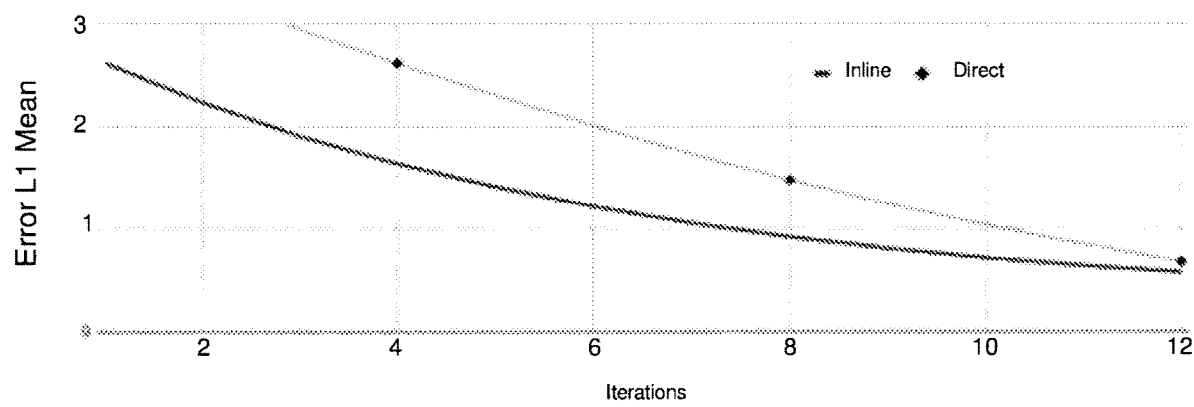
FIG. 14 illustrates the convergence of error projections for the direct matrix methodology compared to the in-line ray projector methodology.

Therefore, the total size of the uncompressed projection operation matrix became a limiting factor for rapid memory utilization. Thus, a directed approach of compression was used with: (i) a further compression operation, (ii) using multiple iterations in a single operation, and (iii) matrix binning. As a result, the overall time to convergence for the directed approach was reduced compared to the in-line method, as shown in FIG. 13 while maintaining image quality. The relative convergence criteria also remained consistent with both solutions converging to approximately the same point, as shown in FIG. 14.

Conclusion

The binning of small weights resulted in a significant reduction in overall matrix size without excessive impact on image quality and convergence. The reduction in matrix size offered a reduction in computation time when used as a multi-iteration model.

Example 3

Figure 15:
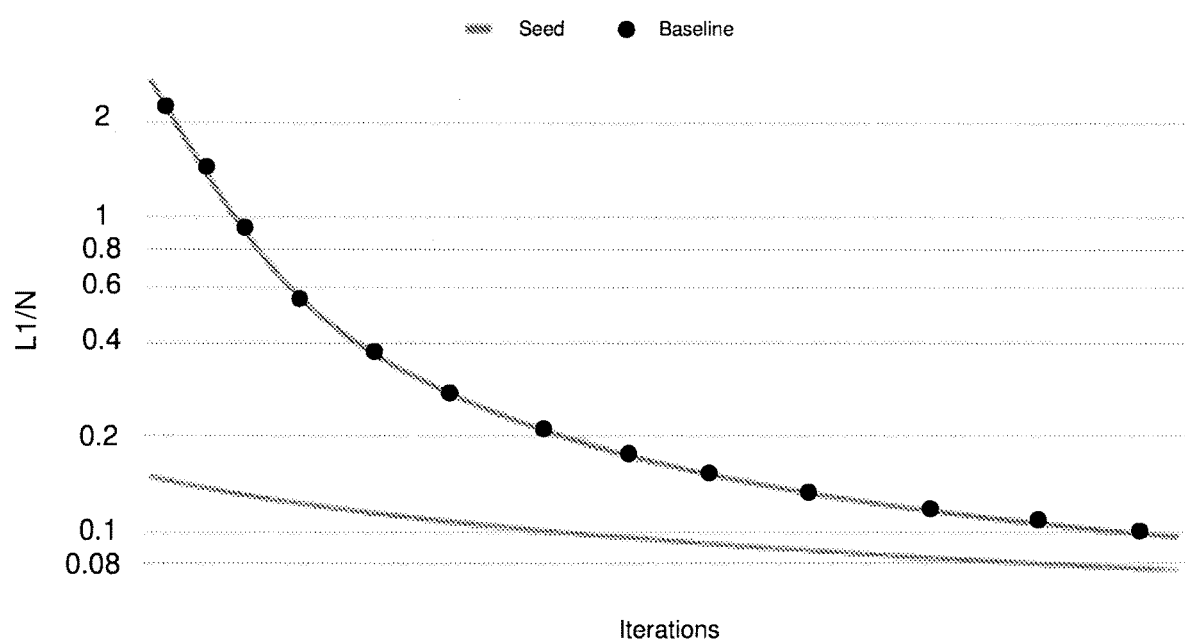
FIG. 15 illustrates the convergence of a seeded Jacobi iteration methodology compared to an unseeded methodology.

A multi-resolution approach was used to apply the acceleration to objects having larger volumes compared to the object volumes used in Examples 1 and 2. While the matrix computation capability was applied to relatively small volumes in Example 2, an upscale and seed application was used for larger volumes. Trilinear upscaling was used with Jacobi iterations. The volumes provided by the in-line method were applied to a higher resolution Jacobi iteration as a seed. The volumes were up sampled using CUDA texture resources and used as an input for the Jacobi iteration algorithm. Both the baseline methodology and the seeded methodology converged approximately to the same point in the error projections, as shown in FIG. 15. However, the seeded methodology reached a lower threshold and a lower final convergence in less time compared to the baseline methodology.

Reference was made to the examples illustrated in the drawings and specific language was used herein to describe the same. It will nevertheless be understood that no limitation of the scope of the technology is thereby intended. Alterations and further modifications of the features illustrated herein, and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. An imaging system, comprising:
   at least one processor configured to apply a projection precomputation algorithm configured to:
   generate a projection operator matrix that is used to calculate a plurality of voxels from a plurality of projection measurements prior to acquiring the plurality of projection measurements, wherein the projection operator matrix is at least one of: a compressed matrix, a multi-iteration projection operator matrix, and a combination thereof; and
   store the projection operator matrix in memory; and
   an x-ray tomography image reconstruction system configured to apply the projection operator matrix to generate a reconstructed three-dimensional image of at least an internal portion of a selected object under a surface of the selected object when the plurality of projection measurements is acquired.

2. The imaging system of claim 1, wherein the projection precomputation algorithm is further configured to accelerate matrix-vector multiplication using the projection operator matrix using at least one of: memory coalescing, compressed sparse row (CSR) compression, a parallelized level instruction set, and a combination thereof.

3. The imaging system of claim 1, wherein the projection precomputation algorithm is further configured to compress the multi-iteration projection operator using at least one of: thresholding to generate a threshold multi-iteration projection operator, and binning to generate a binned multi-iteration projection operator.

4. The imaging system of claim 1, wherein the projection precomputation algorithm is further configured to generate an initial reconstructed three-dimensional image for a subsequent reconstructed three-dimensional image that uses a Jacobi iteration algorithm.

5. The imaging system of claim 1, wherein the projection precomputation algorithm is further configured to use the projection operator matrix at a full resolution to generate an initial reconstructed three-dimensional image and store the projection operator matrix at a resolution that is less than the full resolution.

6. The imaging system of claim 1, wherein the projection precomputation algorithm is further configured to compress the projection operator matrix based on storing smooth-varying parameters and dynamically computing fast-varying parameters based on a model.

7. The imaging system of claim 1, wherein the projection precomputation algorithm is further configured to compress the projection operator matrix based on maintaining regional parameters calculated from voxel-center traversing rays and dynamically computing local parameters calculated from non-voxel center traversing rays.

8. The imaging system of claim 1, wherein the projection precomputation algorithm is further configured to decompose the projection operator matrix into component projection operator matrices based on at least one of: resolution, computation time, storage time, and a combination thereof.

9. The imaging system of claim 1, wherein the projection precomputation algorithm is further configured to:
map the plurality of projection measurements into a Cartesian coordinate grid;
map the plurality of projection measurements into a polar coordinate grid comprising a rotationally invariant matrix and a rotationally variant matrix;
model parallel detector panel planes as square patterns; or a combination thereof.

10. The imaging system of claim 1, wherein the projection precomputation algorithm is further used to reconstruct the three-dimensional image using at least one of a ray-driven projection, a distance-driven projection, a stochastic projection, and a combination thereof.

11. The imaging system of claim 1, wherein the projection precomputation algorithm is further configured to:
store coefficients for the projection operator matrix in 8 bits or less; or
compress the projection operator matrix using at least one of: coordinate format (COO), compressed sparse row (CSR), compressed sparse column (CSC), ELLPACK (ELL), and a combination thereof.

12. The imaging system of claim 1, wherein the projection precomputation algorithm is further configured to apply a reconstruction regularizer operator to generate the projection operator matrix.

13. The imaging system of claim 1, wherein the projection precomputation algorithm is used to generate a reconstructed three-dimensional image using an n View system.

14. The imaging system of claim 1, wherein the projection precomputation algorithm is further configured to apply the projection operator matrix, as the multi-iteration operator, to generate the reconstructed three-dimensional image using a plurality of iterative operations to enhance computational efficiency.

15. The imaging system of claim 14, wherein application of the projection operator matrix, as the multi-iteration operator, is further configured to apply a reconstruction regularizer operator to generate the reconstructed three-dimensional image during the plurality of iterative operations.

16. A method for x-ray tomography image reconstruction, comprising:
generating a projection operator matrix that is used to calculate a plurality of voxels from a plurality of projection measurements prior to acquiring the plurality of projection measurements, wherein the projection operator matrix is at least one of: a compressed matrix, a multi-iteration projection operator matrix, and a combination thereof;
storing the projection operator matrix in memory; and
applying the projection operator matrix to generate a reconstructed three-dimensional image of at least an internal portion of a selected object under a surface of the selected object when the plurality of projection measurements is acquired.

17. The method of claim 16, further comprising accelerating matrix-vector multiplication for the projection operator matrix using at least one of: memory coalescing, compressed sparse row (CSR) compression, a parallelized level instruction set, and a combination thereof.

18. The method of claim 16, further comprising compressing the multi-iteration projection operator using at least one of: thresholding to generate a threshold multi-iteration projection operator, and binning to generate a binned multi-iteration projection operator.

19. The method of claim 16, further comprising generating an initial reconstructed three-dimensional image for a subsequent reconstructed three-dimensional image that uses a Jacobi iteration algorithm.

20. A non-transitory machine-readable storage medium including instructions embodied thereon, wherein the instructions, when executed by at least one processor:
generating a projection operator matrix that is used to calculate a plurality of voxels from a plurality of projection measurements prior to acquiring the plurality of projection measurements, wherein the projection operator matrix is at least one of: a compressed matrix, a multi-iteration projection operator matrix, and a combination thereof;
storing the projection operator matrix in memory; and
applying the projection operator matrix to generate a reconstructed three-dimensional image of at least an internal portion of a selected object under a surface of the selected object when the plurality of projection measurements is acquired.

\* \* \* \* \*